US011302010B2

(12) United States Patent
Asano

(10) Patent No.: US 11,302,010 B2
(45) Date of Patent: Apr. 12, 2022

(54) GAS-DETECTION IMAGE PROCESSING DEVICE, GAS-DETECTION IMAGE PROCESSING METHOD, AND GAS-DETECTION IMAGE PROCESSING PROGRAM

(71) Applicant: Konica Minolta, Inc., Chiyoda-ku (JP)

(72) Inventor: Motohiro Asano, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 12 days.

(21) Appl. No.: 16/610,192

(22) PCT Filed: Apr. 18, 2018

(86) PCT No.: PCT/JP2018/016004
§ 371 (c)(1),
(2) Date: Nov. 1, 2019

(87) PCT Pub. No.: WO2018/203479
PCT Pub. Date: Nov. 8, 2018

(65) Prior Publication Data
US 2020/0118273 A1    Apr. 16, 2020

(30) Foreign Application Priority Data
May 2, 2017   (JP) .............................. JP2017-091795

(51) Int. Cl.
*G06T 7/11*       (2017.01)
*G06T 7/136*      (2017.01)
(Continued)

(52) U.S. Cl.
CPC ................. *G06T 7/11* (2017.01); *G01M 3/38* (2013.01); *G06K 9/00771* (2013.01); *G06K 9/38* (2013.01);
(Continued)

(58) Field of Classification Search
CPC . G06T 2207/10048; G06T 2207/10016; G06T 7/136; G06T 7/11; G06T 7/74;
(Continued)

(56) References Cited

U.S. PATENT DOCUMENTS 5,656,813 A    8/1997 Moore et al.
9,862,144 B2   1/2018 Lane et al.
(Continued)

FOREIGN PATENT DOCUMENTS

JP    2001-349829    12/2001
JP    2006-268200    10/2006
(Continued)

OTHER PUBLICATIONS

Office Action dated May 18, 2021 issued in U.S. Appl. No. 16/610,287.
(Continued)

*Primary Examiner* — Kenny A Cese
(74) *Attorney, Agent, or Firm* — Cozen O'Connor

(57) ABSTRACT

A gas-detection image processing device includes first, second, and third processors. The first processor generates a plurality of first images by applying processing to extract a gas candidate region to each of a plurality of infrared images captured in time series during a predetermined period. The second processor generates a second image, while using the first images, by applying processing to extract an appearance region indicating that a gas candidate region has appeared in at least a part of the predetermined period. The second processor generates two or more second images by applying the processing to extract the appearance region to the first images generated in a manner corresponding to two or more of the predetermined periods respectively. The third processor generates a third image by applying processing to extract
(Continued)

a common region of the appearance regions while using the two or more of the second images.

14 Claims, 17 Drawing Sheets

(51) Int. Cl.
    *G06T 7/73*            (2017.01)
    *G06T 7/174*          (2017.01)
    *G06K 9/00*            (2006.01)
    *G06K 9/38*            (2006.01)
    *G01M 3/38*           (2006.01)
(52) U.S. Cl.
    CPC .............. *G06T 7/136* (2017.01); *G06T 7/174* (2017.01); *G06T 7/74* (2017.01); *G06T 2207/10048* (2013.01); *G06T 2207/30232* (2013.01)
(58) Field of Classification Search
    CPC .......... G06T 7/174; G06T 2207/30232; G06K 9/00771; G06K 9/38; G01M 3/38
    See application file for complete search history.

(56) References Cited

U.S. PATENT DOCUMENTS

| | | |
|---|---|---|
| 2006/0220888 A1 | 10/2006 | Germouni et al. |
| 2010/0078561 A1 | 4/2010 | Gorin |
| 2012/0314080 A1 | 12/2012 | Lee |
| 2013/0113939 A1* | 5/2013 | Strandemar .............. H04N 5/33 348/164 |
| 2014/0008526 A1 | 1/2014 | Zeng et al. |
| 2015/0371386 A1* | 12/2015 | Zeng .................... G01N 21/314 382/171 |
| 2018/0182084 A1* | 6/2018 | Lee .................... G06K 9/00771 |
| 2019/0212261 A1* | 7/2019 | Lannestedt ........... G01J 3/0208 |

FOREIGN PATENT DOCUMENTS

| | | |
|---|---|---|
| JP | 2012-058093 | 3/2012 |
| JP | 2016-206139 | 12/2016 |

OTHER PUBLICATIONS

Office Action dated Oct. 13, 2021 issued in U.S. Appl. No. 16/610,287.

* cited by examiner

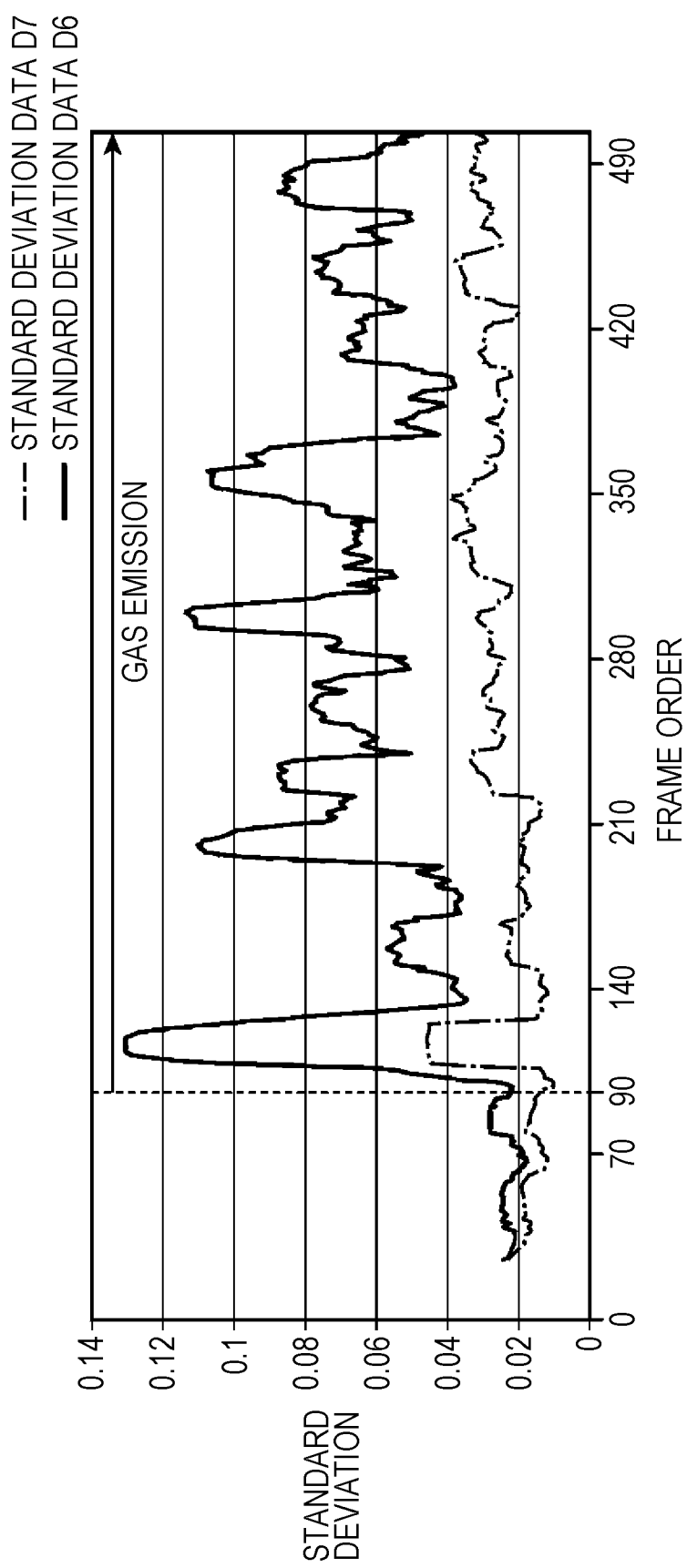

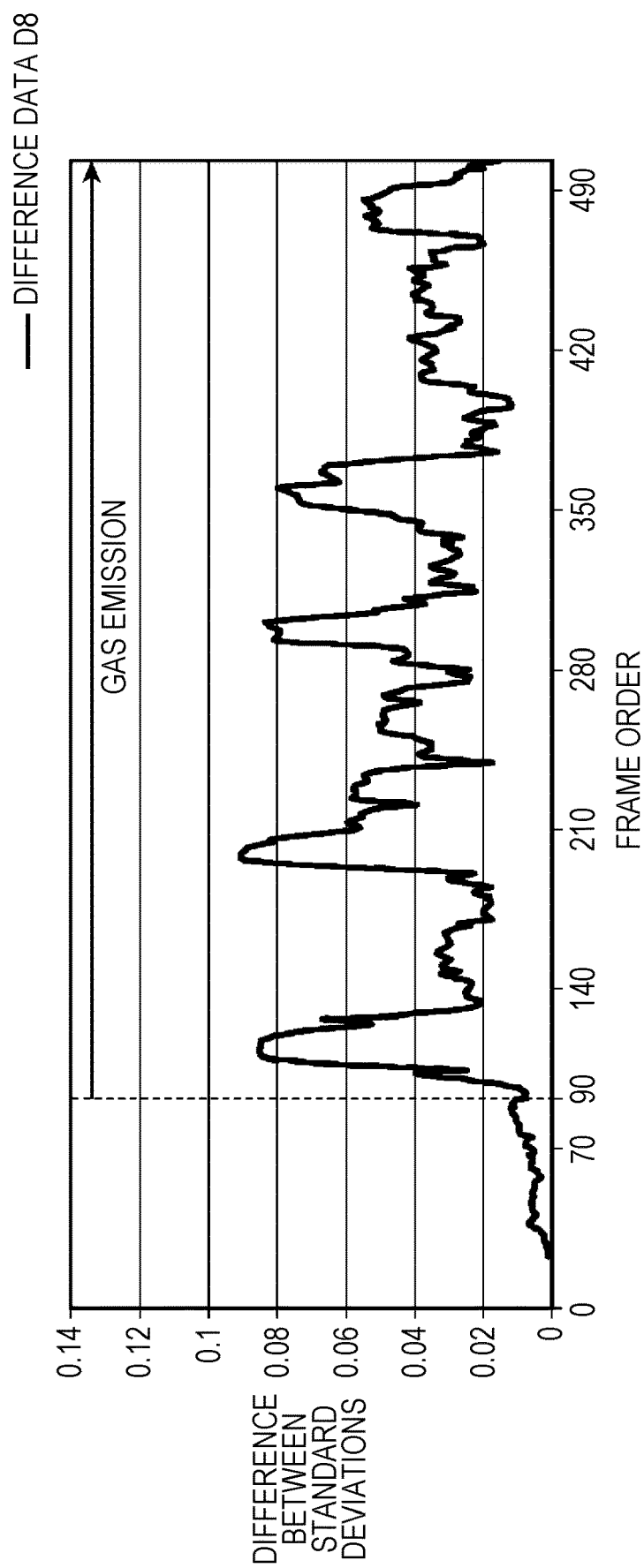

5 SEC.

FIRST IMAGE Im1, FIRST IMAGE Im1, FIRST IMAGE Im1,... FIRST IMAGE Im1

EXTRACT APPEARANCE REGION INDICATING THAT
GAS CANDIDATE REGION HAS APPEARED
IN AT LEAST PART OF 5 SEC.

↓

Im2-1

5 SEC.

FIRST IMAGE Im1, FIRST IMAGE Im1, FIRST IMAGE Im1,... FIRST IMAGE Im1

EXTRACT APPEARANCE REGION INDICATING THAT
GAS CANDIDATE REGION HAS APPEARED IN
AT LEAST PART OF 5 SEC.

↓

Im2-2

GAS-DETECTION IMAGE PROCESSING DEVICE, GAS-DETECTION IMAGE PROCESSING METHOD, AND GAS-DETECTION IMAGE PROCESSING PROGRAM

RELATED APPLICATIONS

This is a U.S. National Phase Application under 35 USC 371 of International Application PCT/JP2018/016004 filed on Apr. 18, 2018.

This application claims the priority of Japanese application no. 2017-091795 filed May 2, 2017, the entire content of which is hereby incorporated by reference.

TECHNICAL FIELD

The present invention relates to a gas detection technology utilizing infrared images.

BACKGROUND ART

When a gas leakage occurs, a temperature is slightly changed in a region where a leaked gas floats in the air. As a gas detection technology utilizing this principle, gas detection utilizing infrared images is known.

As the gas detection utilizing infrared images, Patent Literature 1 discloses, for example, a gas leakage detection device including: an infrared camera that photographs an inspection target region; and an image processor that processes an infrared image photographed by the infrared camera, and the image processor includes a fluctuation extraction unit that extracts, from a plurality of infrared images arranged in time series, dynamic fluctuation caused by gas leakage.

The inventor of the present invention has found, in the gas detection using infrared images, that a gaseous substance (such as steam) that has flown into a view field of a camera is erroneously detected as a gas that constantly comes out from the same position (such as a gas that constantly comes out from a leakage source like a pipe). Note that the same position may be perfectly the same position or may be substantially the same position. The "substantially the same position" means as follows. For example, in a case where a place (leakage source) of leakage that has occurred in a certain pipe is photographed in a manner overlapping with another pipe and the like that are located more on a front side than the leakage source, all of the gas leaked from the leakage source is not photographed, and an image of a part of the gas not overlapping with another pipe and the like is captured. When the gas fluctuates due to influence of wind or the like, there may be a case where the gas does not seem, on an image, to come out from the same leakage source (same position). This case is referred to as that the gas comes out from substantially the same position.

CITATION LIST

Patent Literature

Patent Literature 1: JP 2012-58093 A

SUMMARY OF INVENTION

The present invention is directed to providing a gas-detection image processing device, a gas-detection image processing method, and a gas-detection image processing program which are capable of improving gas detection accuracy.

To achieve the above-mentioned object, a gas-detection image processing device on which one aspect of the present invention is reflected includes a first processor, a second processor, and a third processor. The first processor generates a plurality of first images by applying processing to extract a gas candidate region to each of a plurality of infrared images captured in time series during a predetermined period. The second processor generates, while using the plurality of first images, a second image by applying processing to extract an appearance region indicating that the gas candidate region has appeared in at least a part of the predetermined period. The second processor generates two or more of the second images by applying the processing to extract the appearance region to the plurality of first images generated in a manner corresponding to two or more predetermined periods respectively. In gas-detection image processing device, the third processor generates, while using the two or more of the second images, a third image by applying processing to extract a common region of the appearance regions.

Advantages and characteristics provided by one or more embodiments of the invention are sufficiently understood from the detailed description provided below and the accompanying drawings. The detailed description and the accompanying drawings are provided as only examples and not intended as definitions to limit the present invention.

BRIEF DESCRIPTION OF DRAWINGS

FIG. 8 is a graph illustrating standard deviation data D6 and standard deviation data D7.

FIG. 9 is a graph illustrating difference data D8.

DESCRIPTION OF EMBODIMENTS

Hereinafter, one or more embodiments of the present invention will be described with reference to the drawings. However, the scope of the invention is not limited to the disclosed embodiments.

In the respective drawings, an element denoted by a same reference sign indicates the same element, and matters that have been already described for the element will not be repeatedly described and omitted. In the present specification, in a case of generically naming an element, the element will be denoted by a reference sign without a suffix (e.g., second image Im2), and in a case of individually naming an element, the element will be denoted by the reference sign with a suffix (e.g., second image Im2-1).

Figure 1A:
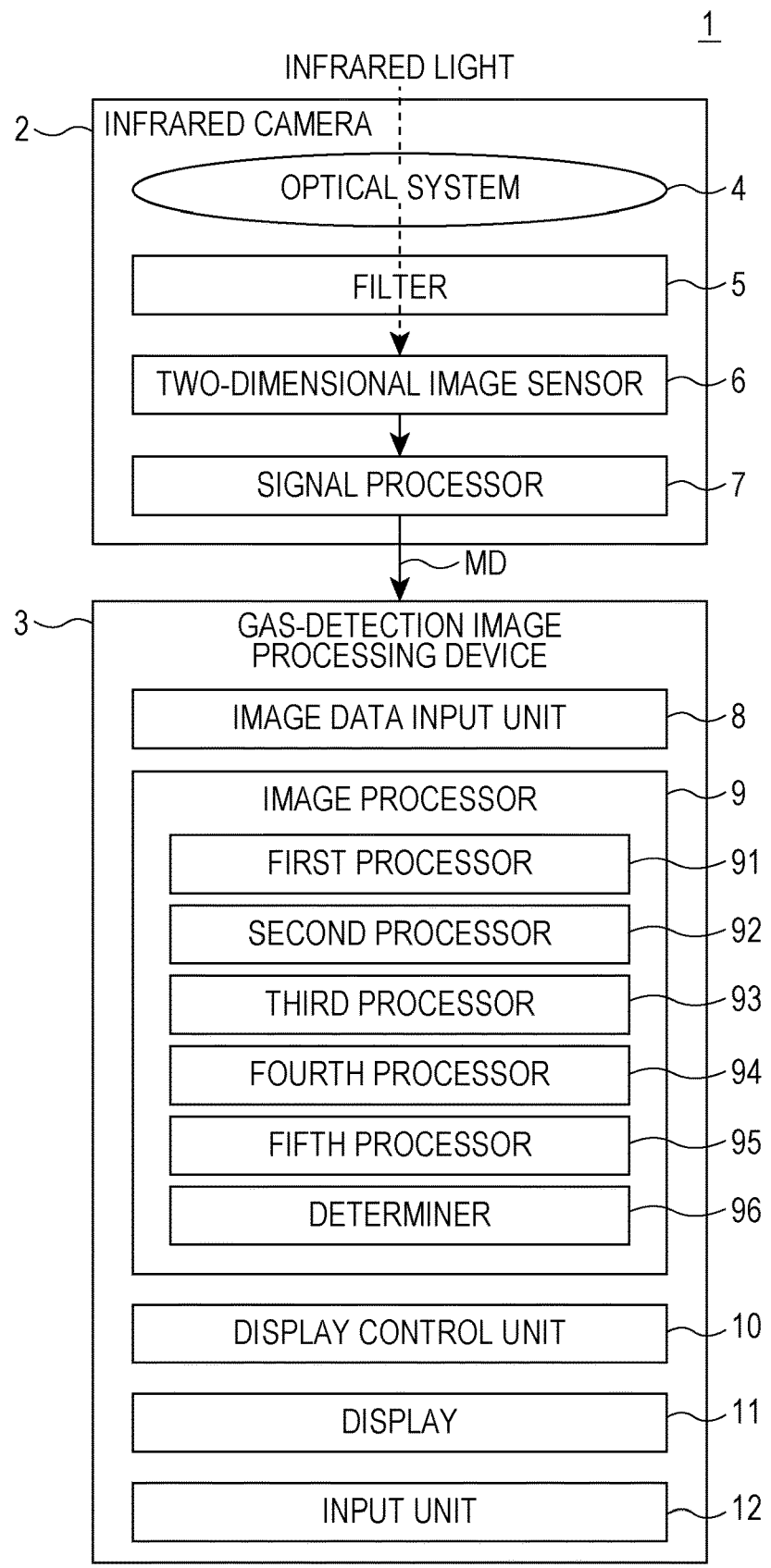
FIG. 1A is a block diagram illustrating a configuration of a gas detection system according to an embodiment.

FIG. 1A is a block diagram illustrating a configuration of a gas detection system 1 according to an embodiment. The gas detection system 1 includes an infrared camera 2 and a gas-detection image processing device 3.

The infrared camera 2 photographs a moving image of infrared images, and generates moving image data MD that represents the moving image for a subject including a monitoring target of gas leakage (for example, a place where gas transport pipes are connected). As far as plurality of infrared images captured in time series is obtained, it is not limited to the moving image. The infrared camera 2 includes an optical system 4, a filter 5, a two-dimensional image sensor 6, and a signal processor 7.

The optical system 4 forms an infrared image of a subject on the two-dimensional image sensor 6. The filter 5 is arranged between the optical system 4 and the two-dimensional image sensor 6 and allows only infrared light of a specific wavelength to pass through out of light having passed through the optical system 4. In a wavelength band of the infrared light, a wavelength band that is allowed to pass through the filter 5 is dependent on a type of gas to be detected. For example, in the case of methane, the filter 5 that allows a wavelength band of 3.2 to 3.4 μm to pass through is used. The two-dimensional image sensor 6 is, for example, a cooling type indium antimony (InSb) image sensor, and receives the infrared light having passed through the filter 5. The signal processor 7 converts an analog signal output from the two-dimensional image sensor 6 into a digital signal, and applies known image processing. This digital signal becomes moving image data MD.

The gas-detection image processing device 3 is a personal computer, a smartphone, a tablet terminal, or the like, and includes an image data input unit 8, an image processor 9, a display control unit 10, a display 11, and an input unit 12 as functional blocks.

The image data input unit 8 is a communication interface that communicates with a communication unit (not illustrated) of the infrared camera 2. The image data input unit 8 receives moving image data MD transmitted from the communication unit of the infrared camera 2. The image data input unit 8 transmits the moving image data MD to the image processor 9.

The image processor 9 applies predetermined processing to the moving image data MD. The predetermined processing is, for example, processing to generate time-series pixel data from the moving image data MD.

Figure 2:
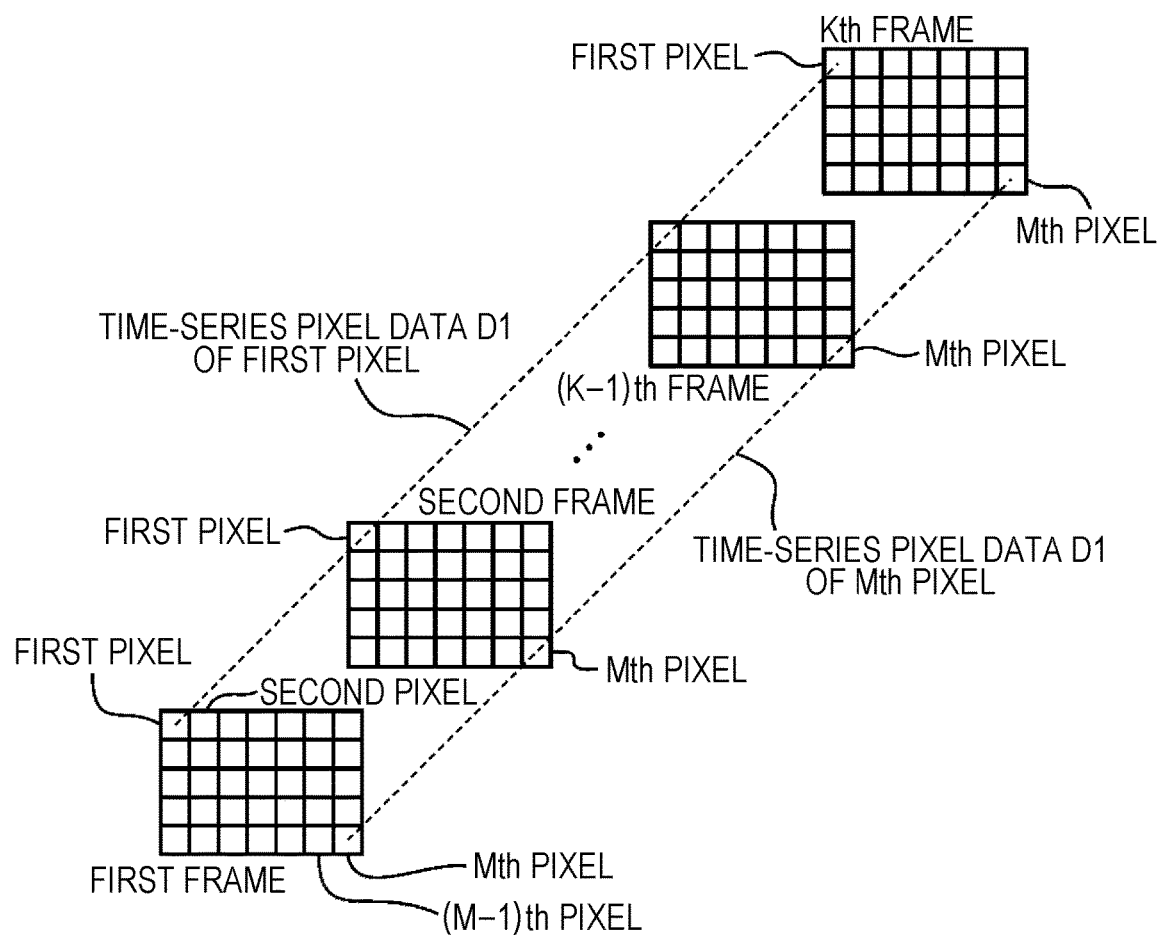
FIG. 2 is an explanatory diagram to describe time-series pixel data D1.

The time-series pixel data will be specifically described. FIG. 2 is an explanatory diagram to describe time-series pixel data D1. A moving image represented by the moving image data MD has a structure in which a plurality of frames is arranged in time series. Data obtained by arranging, in time series, pieces of pixel data of pixels located at the same position in a plurality of frames (a plurality of infrared images) are defined as the time-series pixel data D1. The number of frames of the moving image of the infrared images is defined as K. One frame includes M pixels, specifically, a first pixel, a second pixel, . . . , an (M−1)th pixel, and an Mth pixel. Physical quantities such as luminance and temperature are determined based on pixel data (pixel value).

The "pixels located at the same position in the plurality of (K) frames" stand for pixels having the same order. For example, in a case of describing a first pixel, data obtained by arranging, in time series, pixel data of a first pixel included in a first frame, pixel data of a first pixel included in a second frame, . . . , pixel data of a first pixel included in a (K−1)th frame, and pixel data of a first pixel included in a Kth frame becomes time-series pixel data D1 of the first pixel. Additionally, for example, in a case of describing an Mth pixel, data obtained by arranging, in time series, pixel data of an Mth pixel included in the first frame, pixel data of an Mth pixel included in the second frame, . . . , pixel data of an Mth pixel included in the (K−1)th frame, and pixel data of an Mth pixel included in the Kth frame becomes time-series pixel data D1 of the Mth pixel. The number of pieces of the time-series pixel data D1 is same as the number of pixels constituting one frame.

Referring to FIG. 1A, the image processor 9 includes a first processor 91, a second processor 92, a third processor 93, a fourth processor 94, a fifth processor 95, and a determiner 96. These will be described later.

The display control unit 10 causes the display 11 to display the moving image represented by the moving image data MD and the moving image that has been applied with the predetermined processing in the image processor 9.

The input unit 12 receives various inputs associated with gas detection. The gas-detection image processing device 3 according to the embodiment includes the display control unit 10, the display 11, and the input unit 12, but the gas-detection image processing device 3 may not necessarily include these units.

Figure 1B:
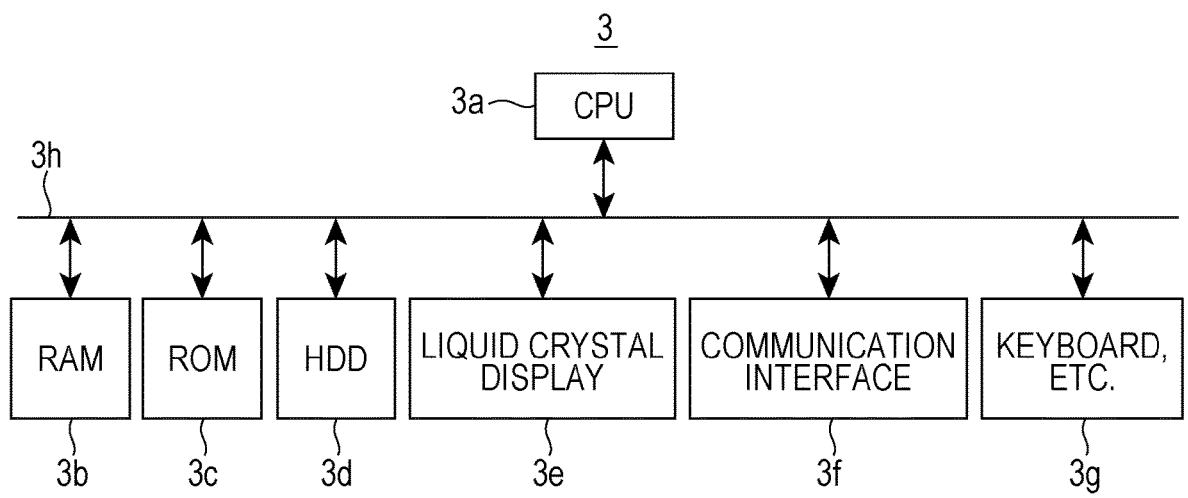
FIG. 1B is a block diagram illustrating a hardware configuration of the gas-detection image processing device illustrated in FIG. 1A.

FIG. 1B is a block diagram illustrating a hardware configuration of the gas-detection image processing device 3 illustrated in FIG. 1A. The gas-detection image processing device 3 includes a central processing unit (CPU) 3a, a random access memory (RAM) 3b, a read only memory (ROM) 3c, a hard disk drive (HDD) 3d, a liquid crystal display 3e, a communication interface 3f, a keyboard, etc. 3g, and a bus 3h connecting these. The liquid crystal display 3e is hardware that implements the display 11. Instead of the liquid crystal display 3e, an organic light emitting diode display (organic EL display), a plasma display, or the like may also be used. The communication interface 3f is hardware that implements the image data input unit 8. The keyboard, etc. 3g correspond to hardware that implements the input unit 12. Instead of the keyboard, a touch panel may also be used.

The HDD 3d stores programs to implement these respective functional blocks, and various kinds of data (e.g., moving image data MD) for the image processor 9 and the display control unit 10. The program to implement the image processor 9 is a processing program to acquire the moving image data MD and apply the predetermined processing to the moving image data MD. The program to implement the display control unit 10 is, for example, a display control program that causes the display 11 to display the moving image represented by the moving image data MD, or causes the display 11 to display the moving image that has been applied with the predetermined processing by the image processor 9. These programs are stored in advance in the HDD 3d, but not limited thereto. For example, a recording medium (such as an external recording medium like a magnetic disk or an optical disc) that records these programs may be prepared, and the programs stored in the recording medium may be stored in the HDD 3d. Also, these programs may be stored in a server connected to the gas-detection image processing device 3 via a network, and these programs may be transmitted to the HDD 3d via the network and stored in the HDD 3d. These programs may be stored in the ROM 3c instead of the HDD 3d. The gas-detection image processing device 3 may include a flash memory instead of the HDD 3d, and these programs may also be stored in the flash memory.

The CPU 3a is an example of a hardware processor, and the image processor 9 and the display control unit 10 are implemented by reading these programs from the HDD 3d, developing these programs in the RAM 3b, and executing the developed programs. However, the functions of the image processor 9 and the functions of the display control unit 10 may be partly or entirely implemented by processing applied by a digital signal processor (DSP) instead of or in combination with the processing the CPU 3a. Also, similarly, these functions may be partly or entirely implemented by processing applied by a dedicated hardware circuit instead of or in combination with processing by software.

Note that the image processor 9 includes the plurality of elements illustrated in FIG. 1A. Accordingly, a program to implement these elements is stored in the HDD 3d. In other words, programs to respectively implement the first processor 91 to the fifth processor 95 and the determiner 96 are stored in the HDD 3d. These programs will be referred to as a first processing program to a fifth processing program, and a determination program.

These programs will be referred to by using element definitions. The first processor 91 and the first processing program will be described as an example. The first processor 91 generates a plurality of first images based on the respective plurality of infrared images by applying processing to extract a gas candidate region to each of a plurality of infrared images captured in time series during a predetermined period. The first processing program is a program to generate a plurality of first images based on each of the plurality of infrared images by applying processing to extract a gas candidate region to each of the plurality of infrared images captured in time series during the predetermined period.

Figure 12:
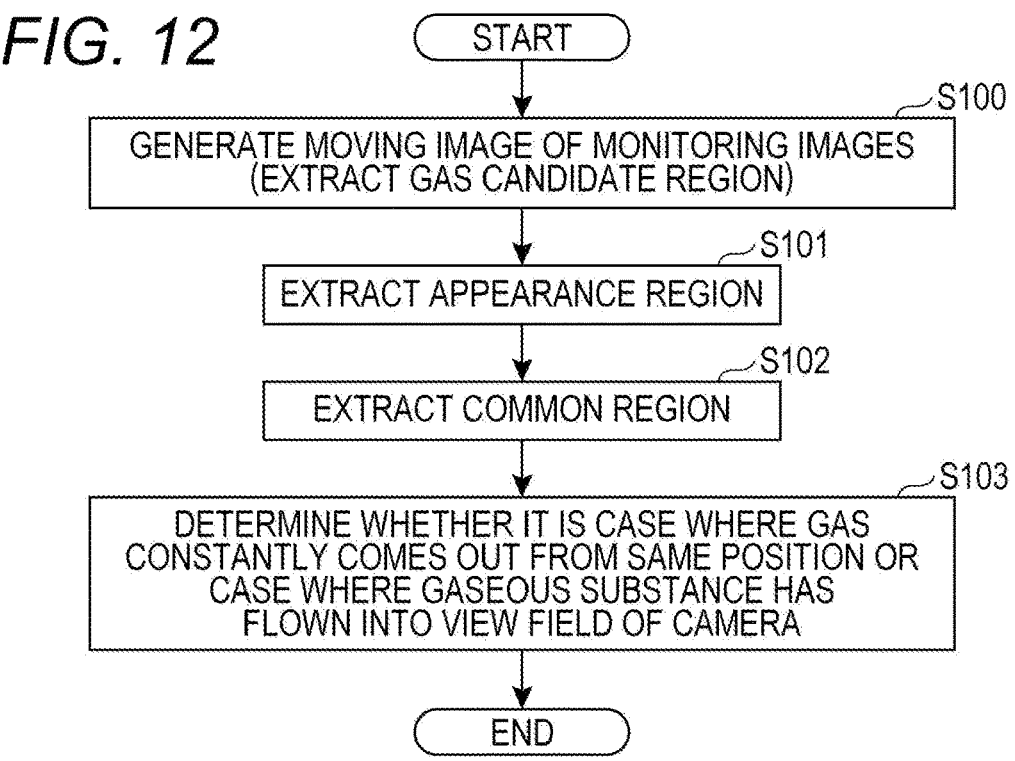
FIG. 12 is a flowchart illustrating image processing executed in the embodiment in order to distinguish whether a gas candidate is a gas that constantly comes out from the same position or a gaseous substance that has flowed into a view field of an infrared camera.

A flowchart of these programs (first processing program, second processing program, and the like) executed by the CPU 3a is illustrated in FIG. 12 described later.

The inventor of the present invention has found, in gas detection utilizing infrared images, that in a case where gas leakage and a background temperature change occur in parallel and the background temperature change is larger than a temperature change caused by the leaked gas, a gas leakage state cannot be displayed without considering the background temperature change. This will be described more in detail.

Figure 3:
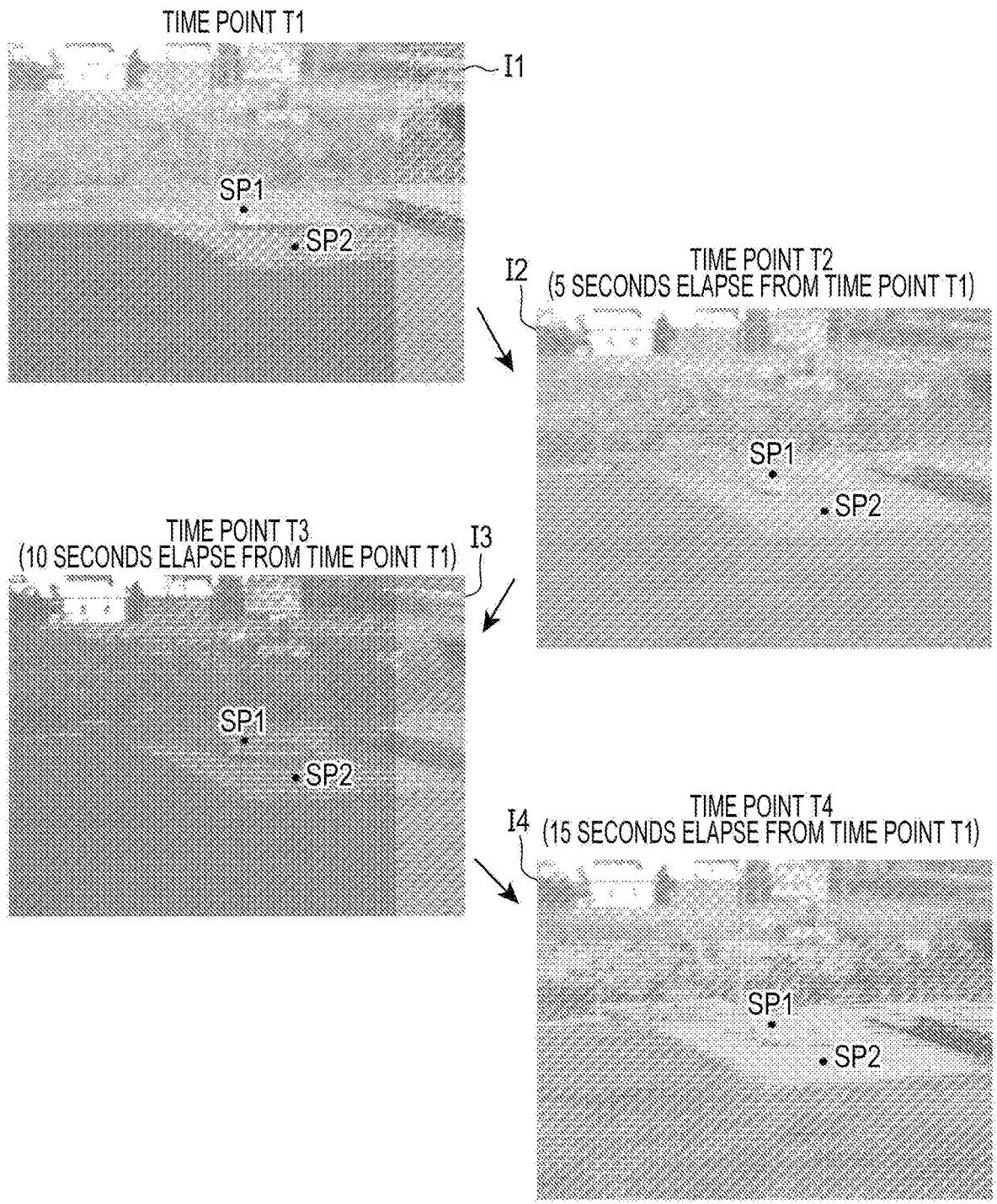
FIG. 3 provides image views illustrating, in time series, infrared images obtained by photographing an outdoor test site in a state in which gas leakage and a background temperature change occur in parallel.

FIG. 3 provides image views illustrating, in time series, infrared images obtained by photographing an outdoor test site in a state in which gas leakage and a background temperature change occur in parallel. These are the infrared images obtained by capturing a moving image with the infrared camera. At the test site, there is a point SP1 where a gas can be emitted. For comparison with the point SP1, a point SP2 where no gas is emitted is illustrated.

An image I1 is an infrared image of the test site photographed at a time point T1 immediately before sunlight is blocked by cloud. An image I2 is an infrared image of the test site photographed at a time point T2 that is a 5 seconds later from the time point T1. At the time point T2, a background temperature is lower than that at the time point T1 because the sunlight is blocked by the cloud.

An image I3 is an infrared image of the test site photographed at a time point T3 that is a 10-second lapse from the time point T1. At the time point T3, the background temperature is lower than that at the time point T2 because the state in which the sunlight is blocked by the cloud is continued from the time point T2 to the time point T3.

An image I4 is an infrared image of the test site photographed at a time point T4 that is 15 seconds later from the time point T1. At the time point T4, the background temperature is lower than that at the time point T3 because the state in which the sunlight is blocked by the cloud is continued from the time point T3 to the time point T4.

The background temperature has dropped by about 4° C. during the 15 seconds from the time point T1 to the time point T4. Therefore, the image I4 is generally darker than the image I1, and it can be grasped that the background temperature is lowered.

Gas emission is started at the point SP1 that is a time point after the time point T1 and before the time point T2. A temperature change caused by the emitted gas is little (about 0.5° C.). Therefore, since the background temperature change is much larger than the temperature change caused by the emitted gas, the state in which the gas comes from the point SP1 cannot be found from the image I2, the image I3, and image I4 although the gas is emitted from the point SP1 at the time point T2, the time point T3, and the time point T4.

Figure 4A:
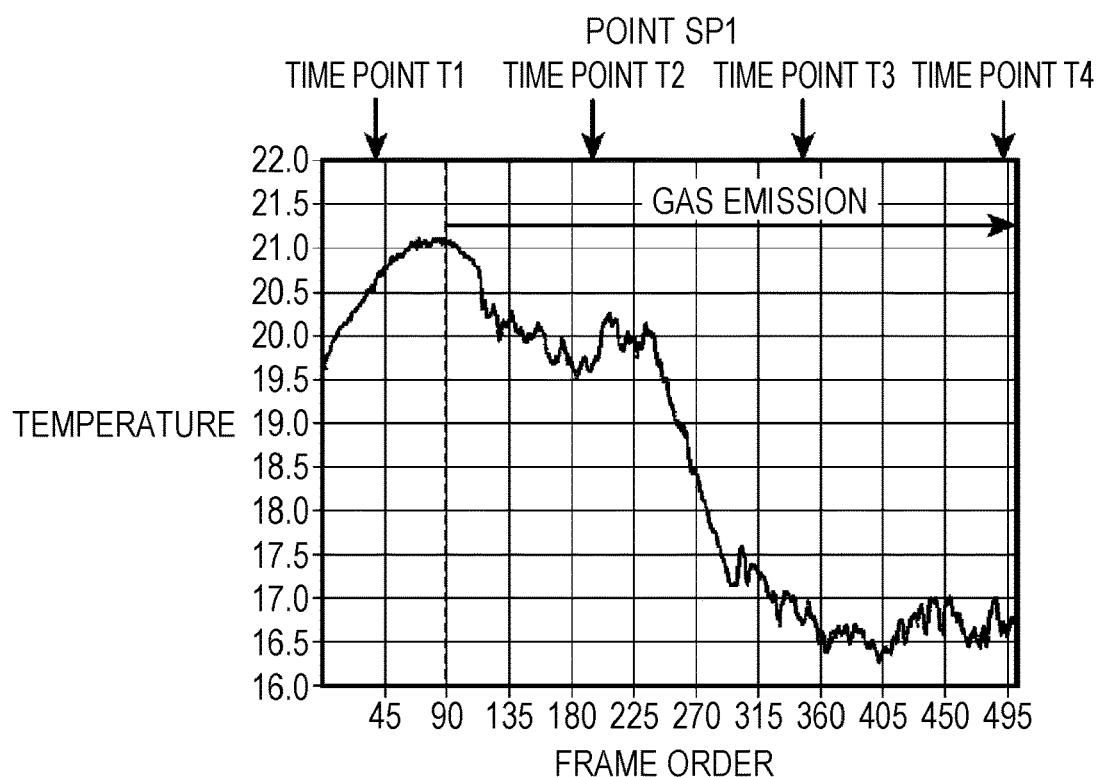
FIG. 4A is a graph illustrating a temperature change at a point SP1 of the test site.
Figure 4B:
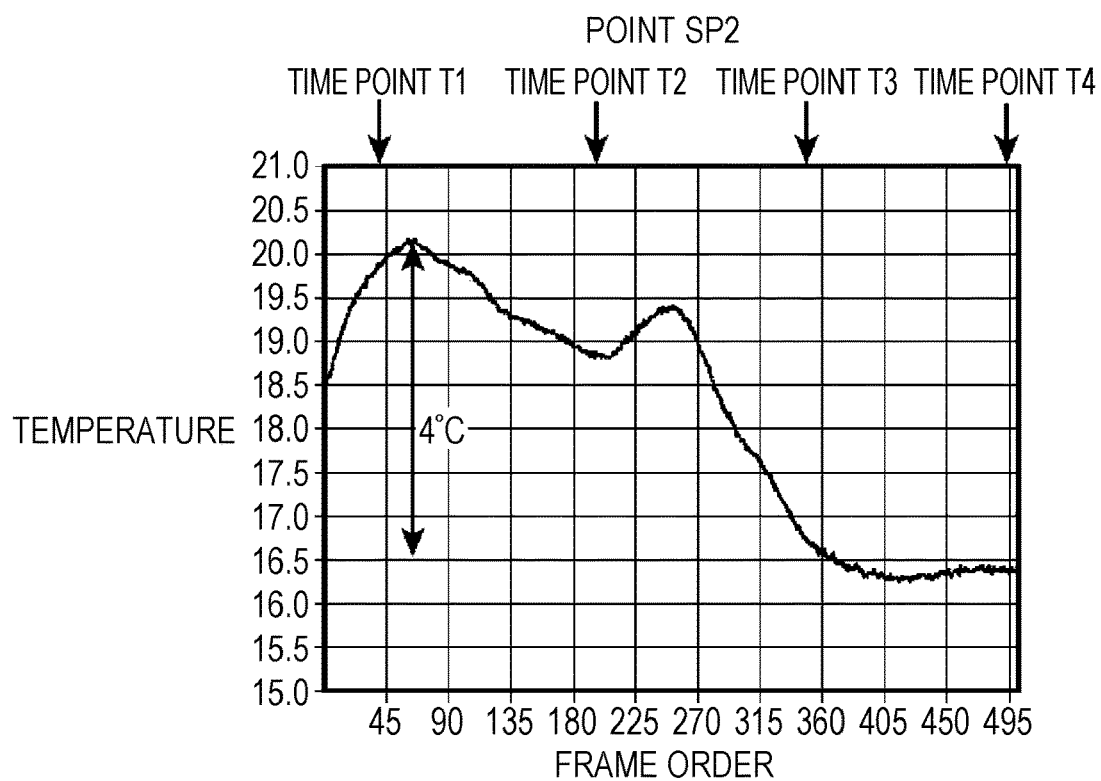
FIG. 4B is a graph illustrating a temperature change at a point SP2 of the test site.

FIG. 4A is a graph illustrating a temperature change at the point SP1 of the test site, and FIG. 4B is a graph illustrating a temperature change at the point SP2 of the test site. A vertical axis in each of the graphs represents the temperature. A horizontal axis in each of the graphs represents the frame order. For example, 45 stands for a 45th frame. A frame rate is 30 fps. Accordingly, a time from a first frame to the 450th frame is 15 seconds.

The graph illustrating the temperature change at the point SP1 differs from the graph illustrating the temperature change at the point SP2. Since no gas is emitted at the point SP2, the temperature change at the point SP2 represents the background temperature change. On the other hand, since the gas is emitted at the point SP1, the gas floats in the air at the point SP1. Therefore, the temperature change at the point SP1 represents the temperature change obtained by adding the background temperature change and the temperature change caused by the leaked gas.

It can be found from the graph illustrated in FIG. 4A that the gas is emitted at the point SP1 (in other words, it can be found that gas leakage occurs at the point SP1). However, as described above, it is not possible to find from the image I2, the image I3, and image I4 illustrated in FIG. 3 that the gas is emitted at the point SP1 (in other words, it is not possible to find that the gas leakage occurs at the point SP1).

Thus, in the case where the background temperature change is much larger than the temperature change caused by the emitted gas (leaked gas), the state in which the gas comes out from the point SP1 cannot be found from the image I2, the image I3, and the image I4 illustrated in FIG. 3.

The reason is that the moving image data MD (FIG. 1A) includes not only frequency component data indicating the temperature change caused by the leaked gas but also low frequency component data D2 having a frequency lower than that of the frequency component data and indicating the background temperature change. An image represented by the frequency component data becomes invisible due to an image represented by the low frequency component data D2 (change in brightness of the background). Referring to FIGS. 4A and 4B, slight changes included in the graph illustrating the temperature change at the point SP1 correspond to the frequency component data. The graph illustrating the temperature change at the point SP2 corresponds to the low frequency component data D2.

Hence, the image processor 9 (FIG. 1A) generates, from the moving image data MD, a plurality of pieces of time-series pixel data D1 having different pixel positions respectively (in other words, a plurality of pieces of time-series pixel data D1 constituting the moving image data MD), and applies processing to remove the low frequency component data D2 to each of the plurality of pieces of time-series pixel data D1. Referring to FIG. 2, the "plurality of pieces of time-series pixel data having the different pixel positions respectively" stands for: time-series pixel data D1 of a first pixel; the time-series pixel data D1 of a second pixel; . . . ; the time-series pixel data D1 of an (M−1)th pixel; and time-series pixel data D1 of an Mth pixel.

The frequency component data, which has a frequency higher than the frequency of the frequency component data indicating the temperature change caused by the leaked gas and indicates high frequency noise, is defined as high frequency component data D3. The image processor 9 applies, to each of the plurality of pieces of time-series pixel data D1 constituting the moving image data MD, processing to remove the high frequency component data D3 in addition to the processing to remove the low frequency component data D2.

Thus, the image processor 9 does not apply, per frame, the processing to remove the low frequency component data D2 and the high frequency component data D3, but applies, per the time-series pixel data D1, the processing to remove the low frequency component data D2 and the high frequency component data D3.

Figure 5:
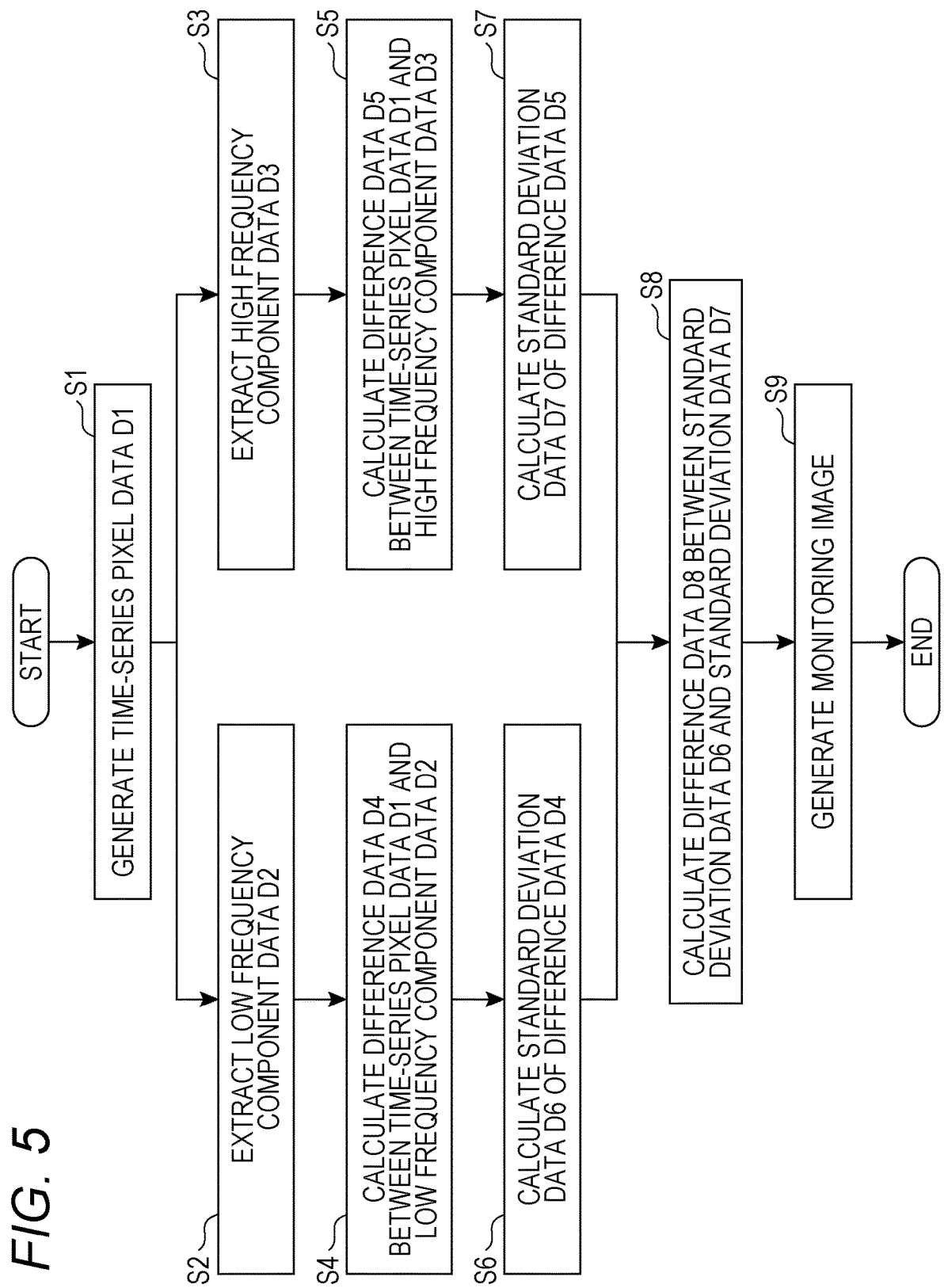
FIG. 5 is a flowchart illustrating generation processing of a monitoring image.

The gas-detection image processing device 3 generates a monitoring image by utilizing infrared images. In a case where gas leakage occurs, a monitoring image includes an image indicating a region where the gas appears due to the gas leakage. The gas-detection image processing device 3 detects the gas leakage based on the monitoring image. There are various methods of generating a monitoring image, but here, one exemplary method of generating a monitoring image will be described. The monitoring image is generated by utilizing infrared images including a monitoring object and a background. FIG. 5 is a flowchart illustrating generation processing of a monitoring image.

Referring to FIGS. 1A, 2, and 5, the image processor 9 generates M pieces of time-series pixel data D1 from moving image data MD (step S1).

The image processor 9 extracts M pieces of low frequency component data D2 respectively corresponding to the M pieces of time-series pixel data D1 while setting, as a piece of low frequency component data D2, a piece of data extracted from each piece of the time-series pixel data D1 by calculating, for each piece of time-series pixel data D1, a simple moving average per first predetermined number of frames fewer than K frames (step S2).

The first predetermined number of frames is, for example, twenty-one frames. Details of content are: a target frame; ten consecutive frames therebefore; and ten consecutive frames thereafter. The first predetermined number may be any number as far as it is possible to extract the low frequency component data D2 from the time-series pixel data D1, and may be more than twenty-one or less than twenty one, not limited to twenty-one.

The image processor 9 extracts M pieces of high frequency component data D3 respectively corresponding to the M pieces of time-series pixel data D1 while setting, as a piece of high frequency component data D3, a piece of data extracted from each piece of time-series pixel data D1 by calculating, for each piece of the time-series pixel data D1, a simple moving average per third predetermined number of frames (for example, three) fewer than the first predetermined number (for example, twenty-one) (step S3).

Figure 6:
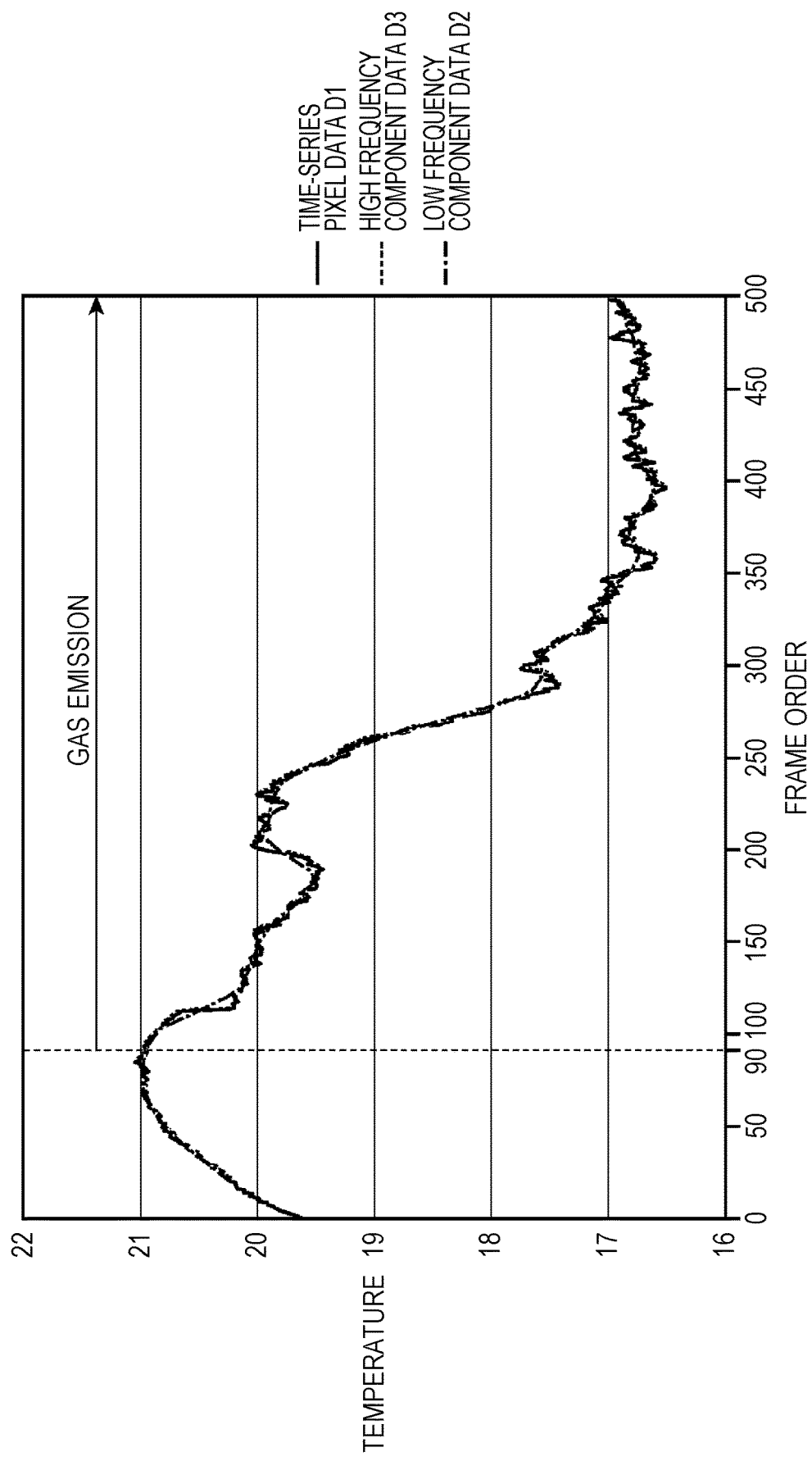
FIG. 6 is a graph illustrating time-series pixel data D1, low frequency component data D2 extracted from the time-series pixel data D1, and high frequency component data D3 extracted from the time-series pixel data D1 of a pixel corresponding to the point SP1 (FIG. 3).

FIG. 6 is a graph illustrating the time-series pixel data D1 of a pixel corresponding to the point SP1 (FIG. 4A), the low frequency component data D2 extracted from the time-series pixel data D1, and the high frequency component data D3 extracted from the time-series pixel data D1. A vertical axis and a horizontal axis of the graph are the same as the vertical axis and the horizontal axis of the graph of FIG. 4A. A temperature represented by the time-series pixel data D1 is changed relatively rapidly (a cycle of the change is relatively short), and a temperature indicated by the low frequency component data D2 is changed relatively slowly (a cycle of the change is relatively long). The high frequency component data D3 seems to substantially overlap with the time-series pixel data D1.

The third predetermined number of frames is, for example, three frames. Details of content are: a target frame;

one frame immediately therebefore; and one frame immediately thereafter. The third predetermined number may be any number as far as it is possible to extract the third frequency component data from the time series pixel data, and the third predetermined number is not limited to three and may be more than three.

Referring to FIGS. 1A, 2, and 5, the image processor 9 calculates M pieces of difference data D4 respectively corresponding to the M pieces of time-series pixel data D1 while setting, as a piece of the difference data D4, a piece of data obtained by calculating a difference between a piece of the time-series pixel data D1 and a piece of the low frequency component data D2 extracted from this piece of time-series pixel data D1 (step S4).

The image processor 9 calculates M pieces of difference data D5 respectively corresponding to the M pieces of time-series pixel data D1 while setting, as a piece of the difference data D5, a piece of data obtained by calculating a difference between a piece of the time-series pixel data D1 and a piece of the high frequency component data D3 extracted from this piece of time-series pixel data D1 (step S5).

Figure 7A:
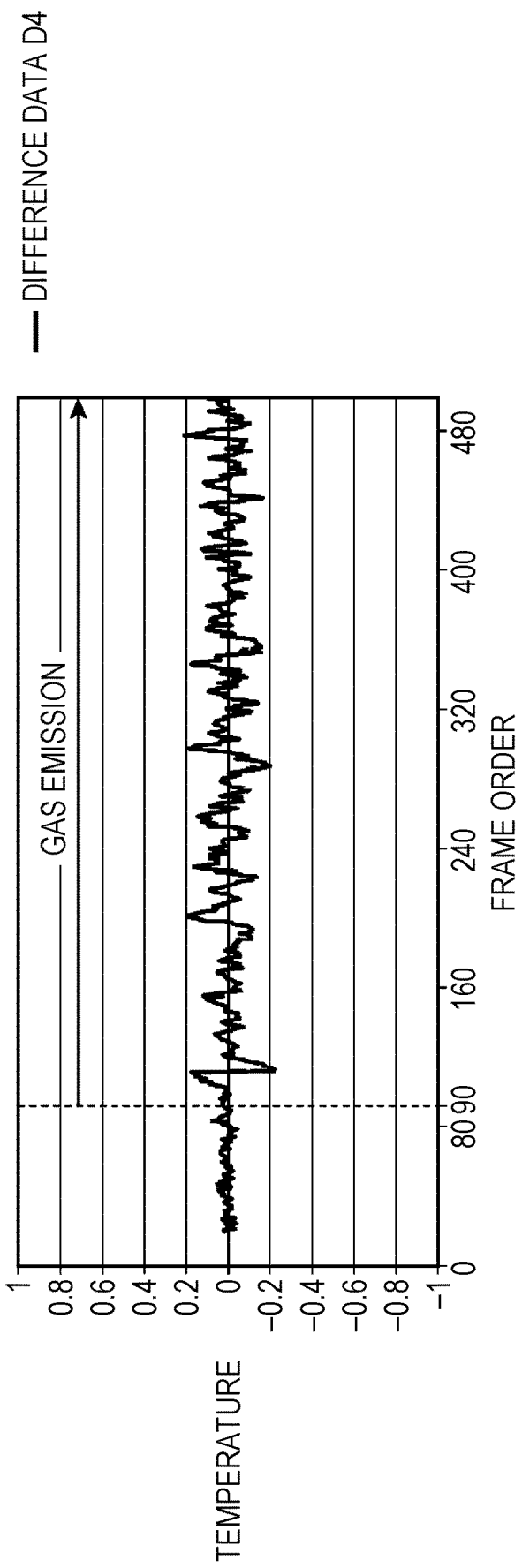
FIG. 7A is a graph illustrating difference data D4.
Figure 7B:
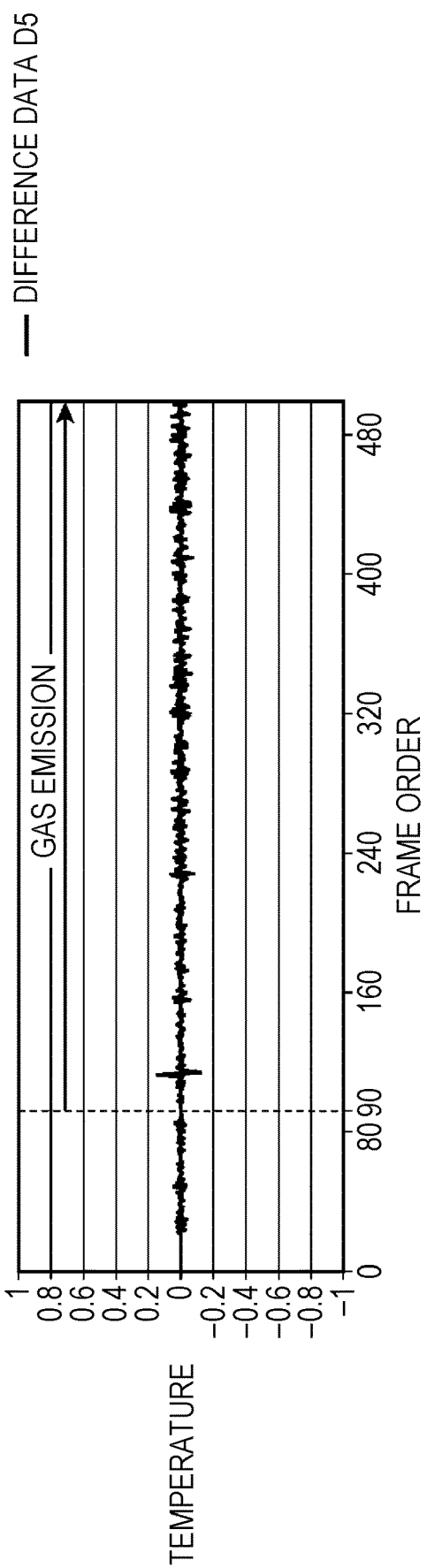
FIG. 7B is a graph illustrating difference data D5.

FIG. 7A is a graph illustrating the difference data D4, and FIG. 7B is a graph illustrating the difference data D5. A vertical axis and a horizontal axis in each of these graphs are the same as the vertical axis and the horizontal axis of the graph of FIG. 4A. The difference data D4 is data obtained by calculating the difference between the time-series pixel data D1 and the low frequency component data D2 which are illustrated in FIG. 6. Before gas emission is started at the point SP1 illustrated in FIG. 4A (in frames up to about 90th frame), repetition of minute amplitude indicated by the difference data D4 mainly represents sensor noise of the two-dimensional image sensor 6. After the gas emission is started at the point SP1 (in 90th and subsequent frames), variation in the amplitude and variation in a waveform of the difference data D4 are increased.

The difference data D5 is data obtained by calculating the difference between the time-series pixel data D1 and the high frequency component data D3 illustrated in FIG. 6.

The difference data D4 includes: the frequency component data indicating the temperature change caused by the leaked gas; and the high frequency component data D3 (data indicating the high frequency noise). The difference data D5 does not include the frequency component data indicating the temperature change caused by the leaked gas, but includes the high frequency component data D3.

Since the difference data D4 includes the frequency component data indicating the temperature change caused by the leaked gas, the variation in the amplitude and the variation in the waveform of the difference data D4 is increased after the gas emission is started at the point SP1 (90th and subsequent frames). On the other hand, such situations do not occur in the difference data D5 because the difference data D5 does not include the frequency component data indicating the temperature change caused by the leaked gas. The difference data D5 repeats minute amplitude. This is the high frequency noise.

The difference data D4 and the difference data D5 are correlated to each other but are not completely correlated. In other words, in a certain frame, a value of the difference data D4 may be positive and a value of the difference data D5 may be negative, or vice versa. Therefore, the high frequency component data D3 cannot be removed by calculating a difference between the difference data D4 and the difference data D5. To remove the high frequency component data D3, it is necessary to convert the difference data D4 and the difference data D5 into values such as absolute values that can be subtracted one from the other.

Hence, the image processor 9 calculates M pieces of standard deviation data D6 respectively corresponding to the M pieces of time-series pixel data D1 while setting, as a piece of standard deviation data D6, a piece of data obtained by calculating, for each piece of difference data D4, a moving standard deviation per second predetermined number of frames fewer than K frames (step S6). Note that movement variance may be calculated instead of the movement standard deviation.

Furthermore, the image processor 9 calculates M pieces of standard deviation data D7 respectively corresponding to the M pieces of time-series pixel data D1 while setting, as a piece of the standard deviation data D7, a piece of data obtained by calculating, for each piece of difference data D5, a movement standard deviation per fourth predetermined number of frames (for example, twenty-one) fewer than the K frames (step S7). Moving variance may be used instead of moving standard deviation.

FIG. 8 is a graph illustrating the standard deviation data D6 and the standard deviation data D7. A horizontal axis of the graph is the same as the horizontal axis of the graph in FIG. 4A. A vertical axis of the graph represents the standard deviation. The standard deviation data D6 is data indicating the movement standard deviation of the difference data D4 illustrated in FIG. 7A. The standard deviation data D7 is data indicating the movement standard deviation of the difference data D5 illustrated in FIG. 7B. The number of frames used in calculating the movement standard deviation is twenty-one for both of the standard deviation data D6 and the standard deviation data D7, but the number of frames is not limited to twenty-one and may be any number as far as it is possible obtain a statistically significant standard deviation.

The standard deviation data D6 and the standard deviation data D7 do not include negative values because both are standard deviations. Therefore, the standard deviation data D6 and the standard deviation data D7 can be deemed as data converted such that subtraction can be executed between the difference data D4 and the difference data D5.

The image processor 9 calculates M pieces of difference data D8 respectively corresponding to the M pieces of time-series pixel data D1 while setting, as a piece of the difference data D8, a piece of data obtained by calculating a difference between a piece of the standard deviation data D6 and a piece of the standard deviation data D7 which are obtained from the same piece of the time-series pixel data D1 (step S8).

FIG. 9 is a graph illustrating the difference data D8. A horizontal axis of the graph is the same as the horizontal axis of the graph in FIG. 4A. A vertical axis of the graph is the difference in the standard deviation. The difference data D8 is data indicating a difference between the standard deviation data D6 and the standard deviation data D7 illustrated in FIG. 8. The difference data D8 is data that has been applied with the processing to remove the low frequency component data D2 and the high frequency component data D3.

The image processor 9 generates a monitoring image (step S9). In other words, the image processor 9 generates a moving image including the M pieces of difference data D8 obtained in step S8. Each of the frames constituting this moving image is a monitoring image. The monitoring image is an image obtained by visualizing the difference in the standard deviation. The image processor 9 outputs, to the display control unit 10, the moving image obtained in step S9. The display control unit 10 causes the display 11 to display this moving image. As monitoring images included in this moving image, there are an image I12 illustrated in FIG. 10 and an image I15 illustrated in FIG. 11, for example.

Figure 10:
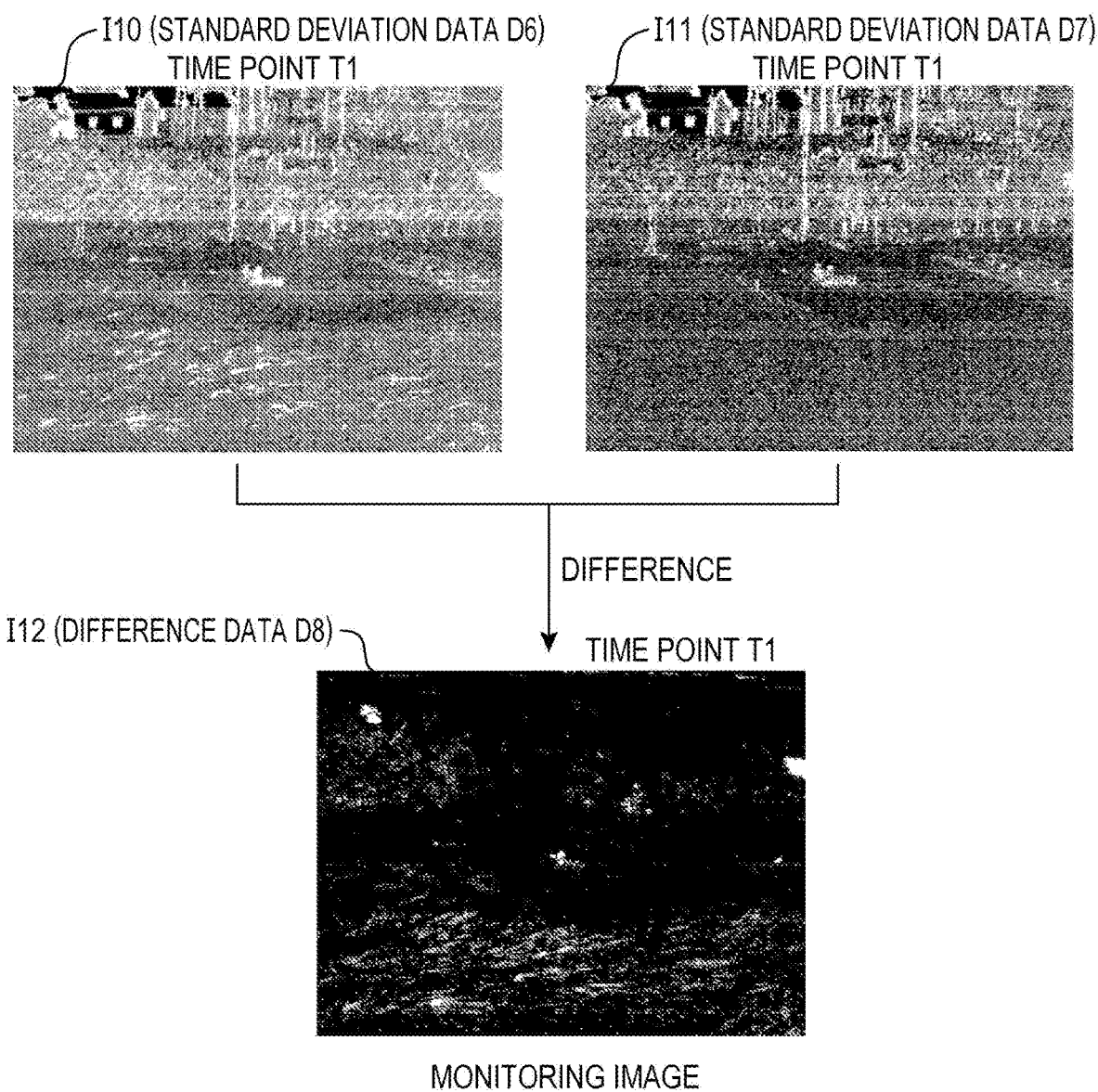
FIG. 10 provides image views illustrating an image I10, an image I11, and an image I12 generated based on a frame at a time point T1.

FIG. 10 provides image views illustrating an image I10, an image I11, and the image I12 generated based on a frame at the time point T1. The image I10 is an image of the frame at the time point T1 in the moving image represented by the M pieces of standard deviation data D6 obtained in step S6 of FIG. 5. The image I11 is an image of the frame at the time point T1 in the moving image represented by the M pieces of standard deviation data D7 obtained in step S7 of FIG. 5. A difference between the image I10 and the image I11 is to be the image I12 (monitoring image).

Figure 11:
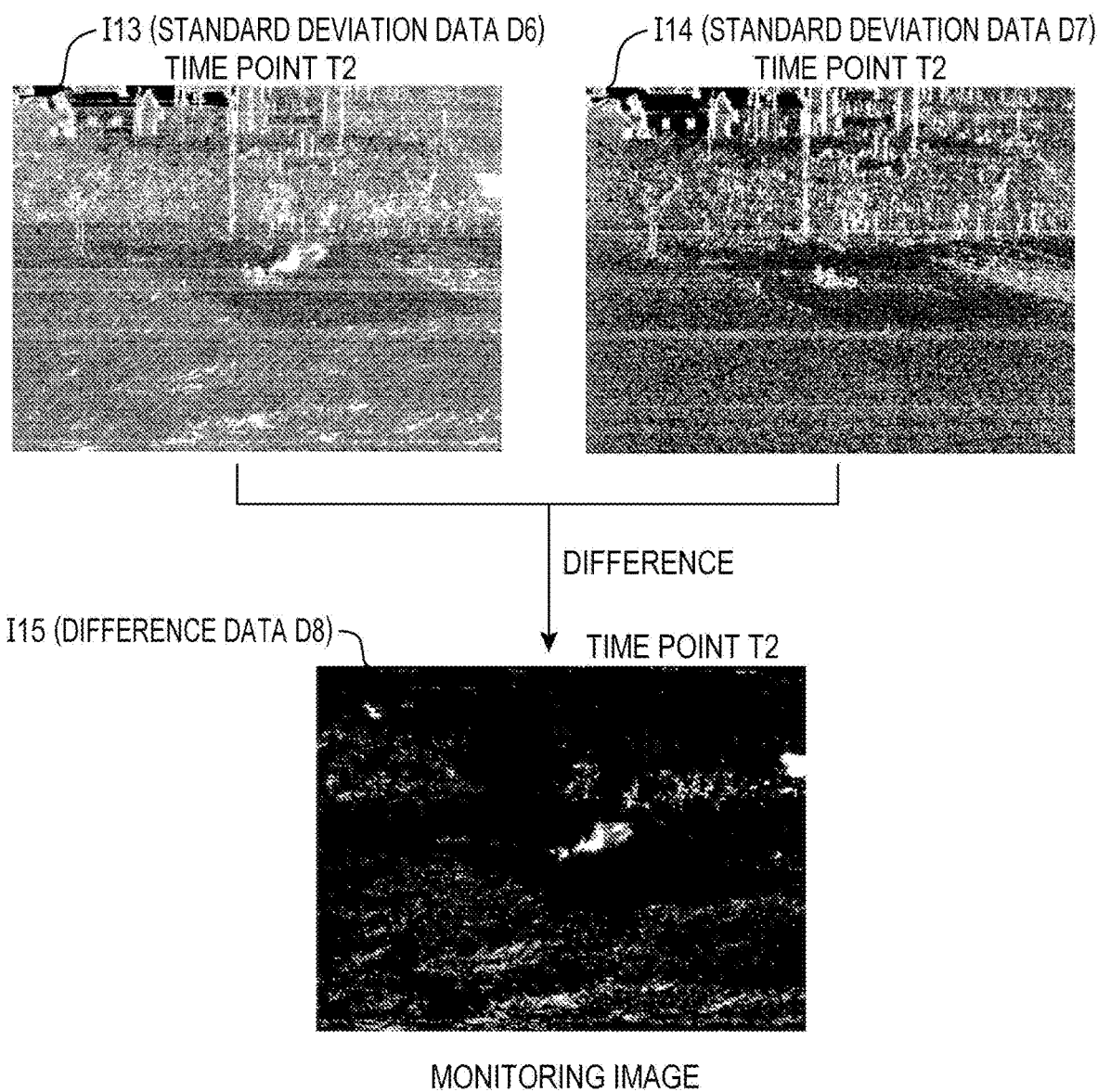
FIG. 11 provides image views illustrating an image I13, an image I14, and an image I15 generated based on a frame at a time point T2.

FIG. 11 provides image views illustrating an image I13, an image I14, and the image I15 generated based on a frame at the time point T2. The image I13 is an image of a frame at the time point T2 in the moving image represented by the M pieces of standard deviation data D6 obtained in step S6. The image I14 is an image of a frame at a time point T2 in the moving image represented by the M pieces of standard deviation data D7 obtained in step S7. A difference between the image I13 and the image I14 is to be the image I15 (monitoring image). All of the images I10 to I15 illustrated in FIGS. 10 and 11 are images obtained by enlarging the standard deviation 5000 times.

Since the image I12 illustrated in FIG. 10 is the image captured before the gas is emitted from the point SP1 illustrated in FIG. 4A, a state in which the gas comes out from the point SP1 does not appear in the image I12. On the other hand, since the image I15 illustrated in FIG. 11 is an image captured at the time point in which the gas is emitted from the point SP1, the state in which the gas comes out from the point SP1 appears in the image I15.

As described above, according to the embodiment, the image processor 9 (FIG. 1A) generates the moving image data by applying the processing to remove low frequency component data D2 included in the moving image data MD of the infrared images, and the display control unit 10 causes the display 11 to display the moving image (the moving image of the monitoring images) represented by the moving image data. Accordingly, according to the embodiment, the state of the gas leakage can be displayed as the moving image of the monitoring images even in a case where the gas leakage and the background temperature change occur in parallel and the background temperature change is larger than the temperature change caused by the leaked gas.

The higher the temperature is, the smaller the sensor noise is, and therefore, the sensor noise is varied in accordance with the temperature. In the two-dimensional image sensor 6 (FIG. 1A), noise in accordance with the temperature sensed by the pixel is generated in each pixel. In other words, noise is not the same in all of the pixels. According to the embodiment, since the high frequency noise can be removed from the moving image, even slight gas leakage can be displayed on the display 11.

In the embodiment, with execution in steps S100 to S103 illustrated in FIG. 12, it is possible to distinguish whether a gas candidate is a gas that constantly comes out from the same position or a gaseous substance that has flown into the view field of the infrared camera 2. FIG. 12 is a flowchart to describe image processing executed in the embodiment in order to distinguish between these gas kinds. This image processing will be described comparing a case where the gas constantly comes out from the same position with a case where the gaseous substance flows into the view field of the infrared camera 2.

Figure 13A:
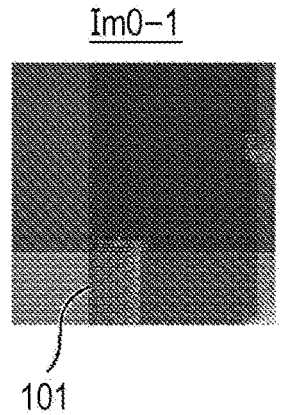
FIG. 13A is an image view illustrating an infrared image in a case where the gaseous substance flows into the view field of the infrared camera.
Figure 13B:
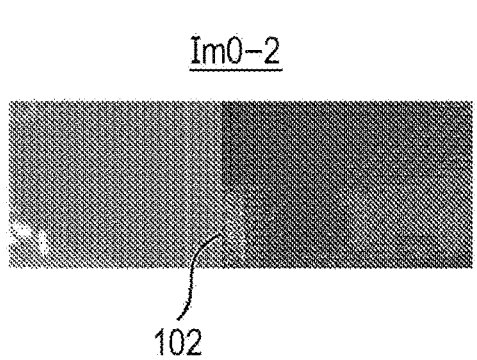
FIG. 13B is an image view illustrating an infrared image in a case where a gas is the gas that constantly comes out from the same position.

FIG. 13A is an image view illustrating an infrared image Im0-1 in the case where the gaseous substance flows into the view field of the infrared camera 2. In FIG. 13A, not an entire portion of the infrared image Im0-1 but only a rectangle portion including a tower image 101 out of the infrared image Im0-1 is illustrated. In this portion, the gaseous substance that flows into the view field of the infrared camera 2 appears. FIG. 13B is an image view illustrating an infrared image Im0-2 in the case where the gas constantly comes out from the same position. In FIG. 13B, not an entire portion of the infrared image Im0-2 but only a rectangular portion including a tower image 102 out of the infrared image Im0-2 is illustrated. In this portion, the gas that constantly comes out from the same position appears.

The first processor 91 illustrated in FIG. 1A generates a moving image of monitoring images by using moving image data MD including a plurality of infrared images Im0 (frames) each including the tower image 102 (FIG. 13B) (step S100 in FIG. 12). More specifically, the first processor 91 applies, to the moving image data MD, the processing in steps S1 to S9 illustrated in FIG. 5. Consequently, the respective frames constituting the moving image are converted from the infrared images Im0 to the monitoring images, and the moving image of the monitoring images is generated. The monitoring image is, for example, the image I12 illustrated in FIG. 10 and the image I15 illustrated in FIG. 11. In a case where any gas candidate appears, a gas candidate region indicating a region where the gas candidate appears is included in each monitoring image. An image of the gas that constantly comes out from the same position may be a gas candidate region, or an image of the gaseous substance that has flown into the view field of the infrared camera 2 may be a gas candidate region. The image I15 is an image captured in 2 seconds after the start of gas emission. A white region located near a center of the image I15 is the gas candidate region. Here, the gas candidate region is the image of the gas that constantly comes out from the same position.

Figure 14:
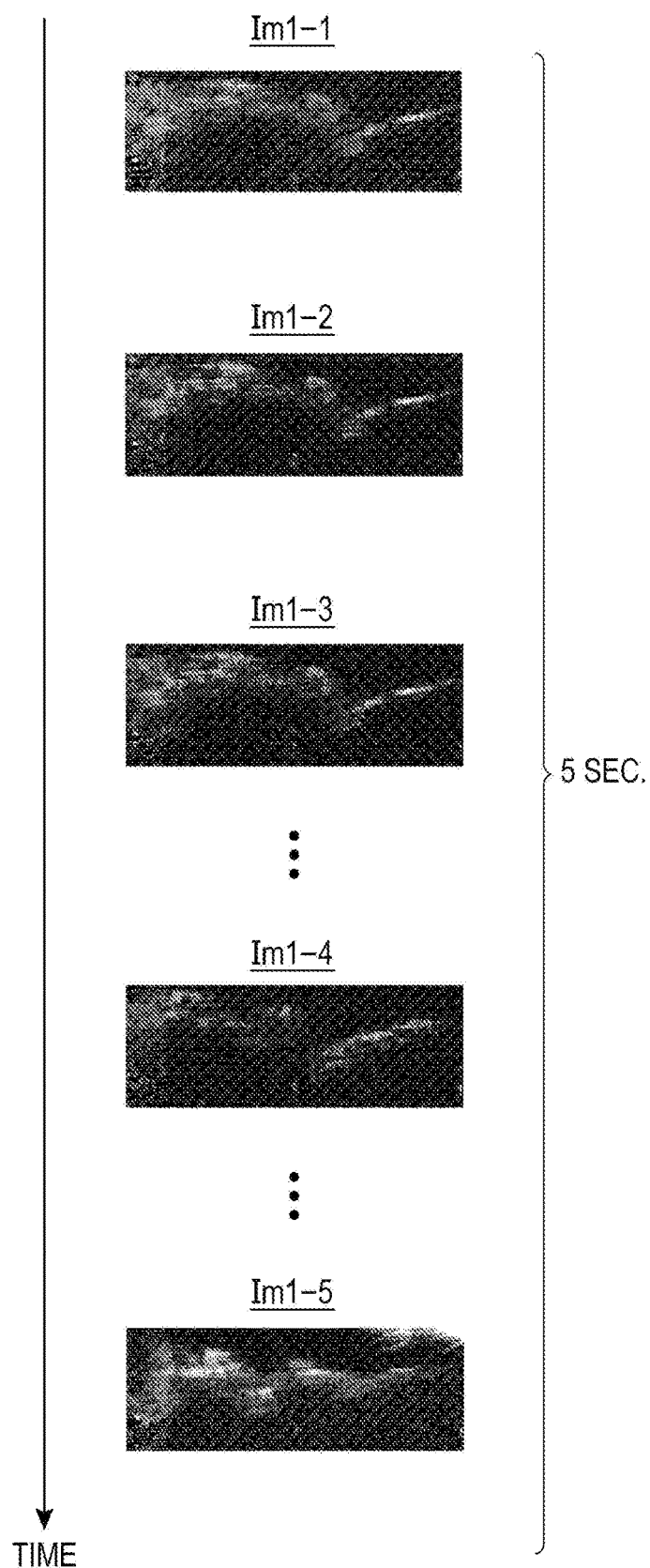
FIG. 14 is an image view illustrating a frame group constituting a moving image of monitoring images generated by using moving image data including a plurality of infrared images (frames) each including a tower image illustrated in FIG. 13B.

FIG. 14 is an image view illustrating a frame group constituting a moving image of monitoring images generated by using the moving image data MD including the plurality of infrared images Im0 (frames) each including the tower image 102 (FIG. 13B). This frame group corresponds to a 5-second moving image. Since the frame rate is 30 fps, the number of frames constituting the frame group is one hundred fifty.

Each frame (monitoring image) is to be a first image Im1. In FIG. 14, not an entire portion of each of first images Im1 but a portion of each of the first images Im1 corresponding to the infrared image Im0-2 illustrated in FIG. 13B is illustrated. In the 5-second moving image, a first image Im1-1 is a first frame, a first image Im1-2 is a second frame, a first image Im1-3 is a third frame, a first image Im1-4 is a kth frame (3<k<150), and a first image Im1-5 is a 150th frame (final frame). In each of the first images Im1, a gas candidate region is indicated in white and gray.

Similarly, the first processor 91 generates a moving image of monitoring images by using moving image data MD including the plurality of infrared images Im0 (frames) each including the tower image 101 (FIG. 13A). Images representing this frame group constituting this moving image are not illustrated.

In the embodiment, a gas candidate region is obtained in the processing from step S1 to step S9 illustrated in FIG. 5, but a known technology of obtaining a gas candidate region by applying image processing to infrared images (for example, image processing disclosed in Patent Literature 1) may also be used.

As described above, the first processor 91 generates the plurality of first images Im1 based on the respective plurality of infrared images Im0 by applying the processing to extract the gas candidate region to each of the plurality of infrared images Im0 captured in time series during the predetermined period.

Next, extraction of an appearance region will be described (step S101 in FIG. 12). The appearance region is a region indicating appearance of a gas candidate region in at least a part of the predetermined period. As the predetermined period, the description will be provided by exemplifying 5 seconds, but the predetermined period is not limited thereto. The second processor 92 illustrated in FIG. 1A generates a second image Im2 based on the plurality of first images Im1 by applying the processing to extract the appearance region while using the plurality of first images Im1 (here, one hundred fifty frames) arrayed in time series.

Figure 15A:
FIG. 15A is an image view illustrating a second image in the case where the gaseous substance flows into the view field of the infrared camera.

FIG. 15A is an image view illustrating a second image Im2-1 in the case where the gaseous substance flows into the view field of the infrared camera 2. In FIG. 15A, not an entire portion of the second image Im2-1 but a portion of the second image Im2-1 corresponding to the infrared image Im0-1 illustrated in FIG. 13A is illustrated. The plurality of first images Im1 used to generate the second images Im2-1 is not illustrated, but is the plurality of first images Im1 generated by using the moving image data MD of the infrared images Im0 each including the tower image 101 (FIG. 13A). A white region and a gray region included in FIG. 15A correspond to an appearance region.

Figure 15B:
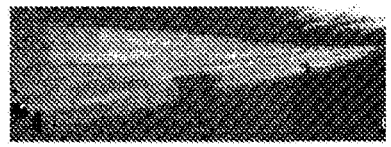
FIG. 15B is an image view illustrating a second image in the case where the gas constantly comes out from the same position.

FIG. 15B is an image view illustrating a second image Im2-2 in the case where the gas constantly comes out from the same position. In FIG. 15B, not an entire portion of second image Im2-2 but a portion of the second image Im2-2 corresponding to the infrared image Im0-2 illustrated in FIG. 13B is illustrated. The plurality of first images Im1 used to generate the second images Im2-2 is the plurality of first images Im1-1 to Im1-5 illustrated in FIG. 14. These are the plurality of first images Im1 generated by using the moving image data MD of the infrared images Im0 each including the tower image 102 (FIG. 13B). A white region and a gray region included in FIG. 15B correspond to an appearance region.

An exemplary method of generating a second image Im2 (in other words, a method of extracting an appearance region) will be described. The second processor 92 determines, from among pixels located in the same order in a plurality of first images Im1 (for example, the plurality of first images Im1-1 to Im1-5 illustrated in FIG. 14), a maximum value of values indicated by the pixels (here, a difference between standard deviations). The second processor 92 sets this maximum value as a value of a pixel located in the mentioned order of each second image Im2. More specifically, the second processor 92 determines a maximum value of values indicated by first pixels in the respective plurality of first images Im1, and sets this value as a value of a first pixel in a second image Im2. The second processor 92 determines a maximum value of values indicated by second pixels in the respective plurality of first images Im1, and sets this value as a value of a second pixel of the second image Im2. The second processor 92 applies the similar processing to third and subsequent pixels.

Thus, when the values of the pixels constituting the second image Im2 are determined, an appearance region is extracted, and the appearance region is included in the second image Im2.

The second processor 92 generates two or more of the second images Im2 by applying the processing to extract an appearance region to the plurality of first images Im1 generated in a manner corresponding to respective two or more of the predetermined periods. Here, an example in which two or more of the predetermined periods are set as three predetermined periods will be described.

Figure 16A:
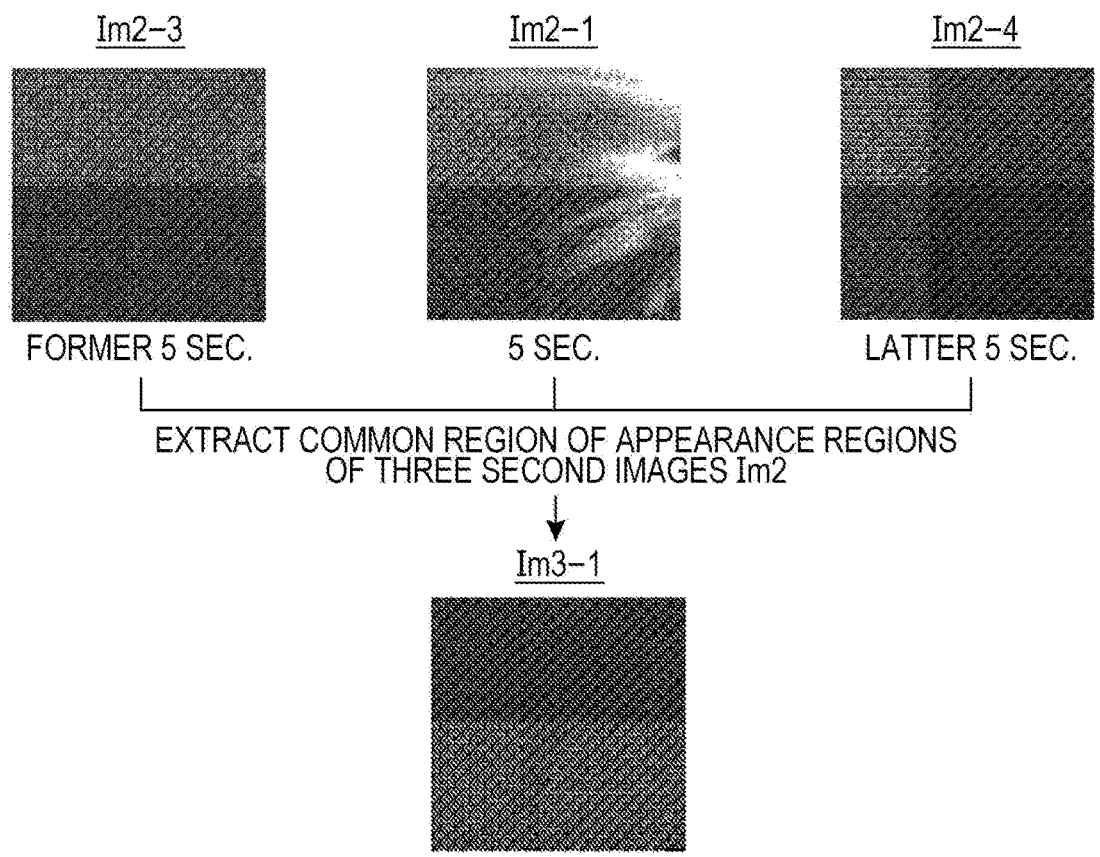
FIG. 16A provides image views illustrating three second images and a third image generated based on these second images in the case where the gaseous substance flows into the view field of the infrared camera.

The second processor 92 generates a second image Im2 by using a plurality of first images Im1 constituting a former 5-second moving image before a 5-second moving image including the plurality of first images Im1 used to generate the second image Im2-1 illustrated in FIG. 15A, and also generates a second image Im2 by using a plurality of first images Im1 constituting a latter 5-second moving image. These 5-second periods are the three predetermined periods. FIG. 16A provides image views illustrating three second images Im2-3, Im2-1, Im2-4, and a third image Im3-1 generated based on these. In FIG. 16A, not entire portions of the second image Im2-1, Im2-1, Im2-4, and the third image Im3-1 but portions of these images corresponding to the infrared image Im0-1 illustrated in FIG. 13A are illustrated.

A 5-second moving image including a plurality of first images Im1 used to generate the second image Im2-3 may be continuous or not continuous to a 5-second moving image including a plurality of first images Im1 used to generate the second image Im2-1. Similarly, a 5-second moving image including a plurality of first images Im1 used to generate the second image Im2-4 may be continuous or not continuous to the 5-second moving image including the plurality of first images Im1 used to generate the second image Im2-1.

A specific example in the case of being continuous will be described. The second processor 92 generates, out of a 15-second moving image, the second image Im2-3 by using a plurality of first images Im1 constituting a moving image from 1 to 5 seconds, generates the second image Im2-1 by using a plurality of first images Im1 constituting a moving image from 6 to 10 seconds, and generates the second image Im2-4 by using a plurality of first images Im1 constituting a moving image from 11 to 15 seconds. A specific example in the case of not being continuous will be described. The second processor 92 generates, out of a 25-second moving image, the second image Im2-3 by using the plurality of first images Im1 constituting the moving image from 1 to 5 seconds, generates the second image Im2-1 by using a plurality of first images Im1 constituting a moving image from 11 to 15 seconds, and generates the second image Im2-4 by using a plurality of first images Im1 constituting a moving image from 21 to 25 seconds.

In a case where any appearance region is included in the second image Im2, the appearance region is indicated in white and gray. No appearance region is included in the second image Im2-3. The reason is that no gas candidate region is included in the plurality of first images Im1 used to generate the second Im2-3 because no gaseous substance has flown into the view field of the infrared camera 2 in the "former 5 seconds". No appearance region is included in the second image Im2-4. The reason is that no gas candidate region is included in the plurality of first images Im1 used to generate the second image Im2-4 because the gaseous substance having flown into the view field of the infrared camera 2 has already finished passing through the view field in the "latter 5 seconds".

Figure 16B:
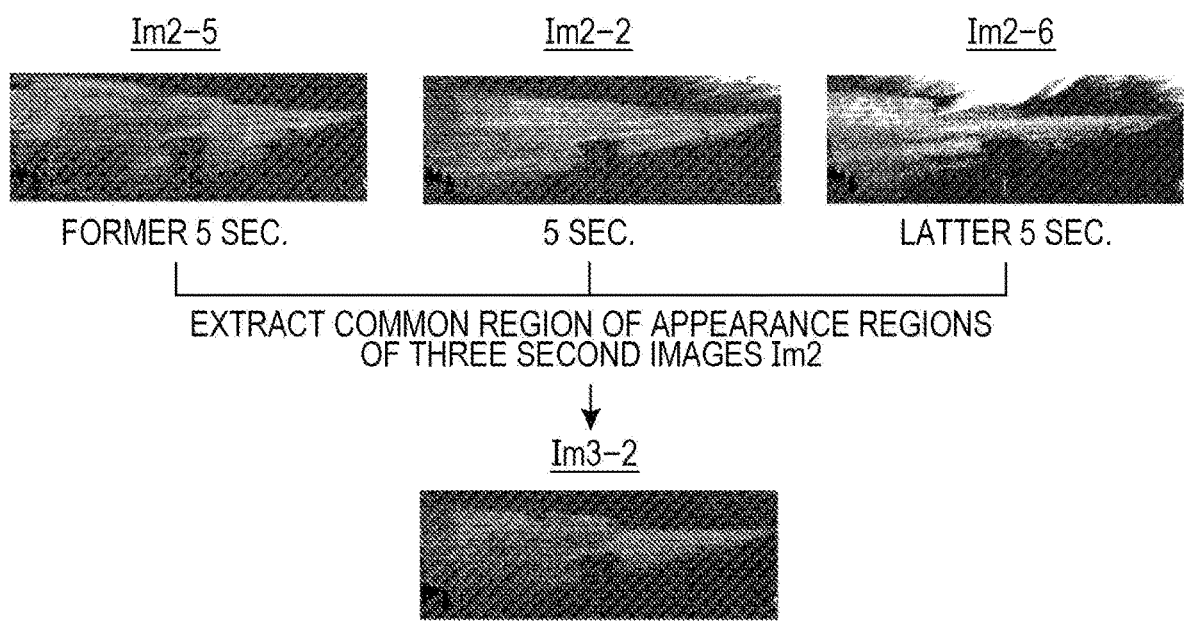
FIG. 16B provides image views illustrating three second images and a third image generated based on these second images in the case where the gas constantly comes out from the same position.

The second processor 92 generates a second image Im2 by using a plurality of first images Im1 constituting a former 5-second moving image before a 5-second moving image including the plurality of first images Im1 used to generate the second image Im2-2 illustrated in FIG. 15B, and further generates a second image Im2 by using a plurality of first images Im1 constituting a latter 5-second moving image. FIG. 16B provides image views illustrating three second images Im2-5, Im2-2, Im2-6, and a third image Im3-2 generated based on these. In FIG. 16B, not entire portions of the second image Im2-5, Im2-2, Im2-6, and the third image Im3-2 but portions of these images corresponding to the infrared image Im0-2 illustrated in FIG. 13B are illustrated.

A 5-second moving image including a plurality of first images Im1 used to generate the second image Im2-5 may be continuous or not continuous to the 5-second moving image including the plurality of first images Im1 used to generate the second image Im2-2. Similarly, a 5-second moving image including a plurality of first images Im1 used to generate the second image Im2-6 may be continuous or not continuous to the 5-second moving image including the plurality of first images Im1 used to generate the second image Im2-2.

In a case where any appearance region is included in the second image Im2, the appearance region is indicated in white and gray. Appearance regions are included in all of the second images Im2-5, Im2-2, and Im2-6. Since the gas constantly comes out from the same position, the plurality of first images Im1 used to generate the second images Im2-5, Im2-2, and Im2-6 includes gas candidate regions.

Next, extraction of a common region will be described (step S102 in FIG. 12). To extract a common region, two or more of second images Im2 are used. Using three second images Im2 will be described as an example. Referring to FIG. 16A, the third processor 93 illustrated in FIG. 1A generates the third image Im3-1 based on second images Im2-3, Im2-1, and Im2-4 by executing processing to extract a common region of appearance regions while using these second images Im2.

In a case where any common region is included in the third image Im3, the common region is indicated in white and gray. Since no appearance region is included in the second image Im2-3 and Im2-4, no common region is included in the third image Im3-1.

Referring to FIG. 16B, the third processor 93 illustrated in FIG. 1A generates the third image Im3-2 based on second images Im2-5, Im2-2, and Im2-6 while using these second images Im2 by executing the processing to extract a common region of appearance regions. In a case where any common region is included in the third image Im3, the common region is indicated in white and gray. Since appearance regions are included in all of the second images Im2-5, Im2-2 and Im2-6, a common region is included in the third image Im3-2.

An exemplary method of generating a third image Im3 (in other words, a method of extracting a common region) will be described by using the third image Im3-1. Referring to FIG. 16A, the third processor 93 determines, from among pixels located in the same order in the second image Im2-3, the second image Im2-1, and the second image Im2-4, a minimum value of values indicated by the pixels. The third processor 93 sets this minimum value as a value of a pixel located in the mentioned order of a third images Im3. More specifically, the third processor 93 determines the minimum value of the values indicated by the first pixels in the second image Im2-3, the second image Im2-1, and the second image Im2-4, and sets this value as the value of the first pixel of the third image Im3-1. The third processor 93 determines a minimum value of values indicated by second pixels in the second image Im2-3, the second image Im2-1, and the second image Im2-4, and sets this value as a value of a second pixel of the third image Im3-1. The third processor 93 applies the similar processing to the third and subsequent pixels.

Thus, when values of the pixels constituting the third image Im3 are determined, a common region of the appearance regions of the three second images Im2 can be extracted. The reason for adopting the common region of the appearance regions instead of a common region of gas candidate regions is as next. Since the gas fluctuates irregularly, a position and area of a gas candidate region is changed every moment (e.g., FIG. 14). In a case of adopting the common region of the gas candidate regions, the area is reduced regardless of whether a common region is present or no common region is present even in the case where the gas constantly comes out from the same position.

The appearance region is used in order to prevent influence of every moment change in the position and the area of the gas candidate region caused by the irregular fluctuation of the gas. Accordingly, a length of a predetermined period is set considering this. The embodiment describes the example of setting a 5-second period as the predetermined period, but as far as the above-mentioned influence is not received, the predetermined period may be, for example, 3 seconds or 10 seconds.

The example has been described by using the example in which the three second images Im2 are used to generate the third image Im3, but two of second images Im2 may be used, or four or more of second images Im2 may be used to generate a third image Im3. For example, in a case where the gas continuously comes out for a long period, the number of second images Im2 is increased (e.g., five).

Figure 17A:
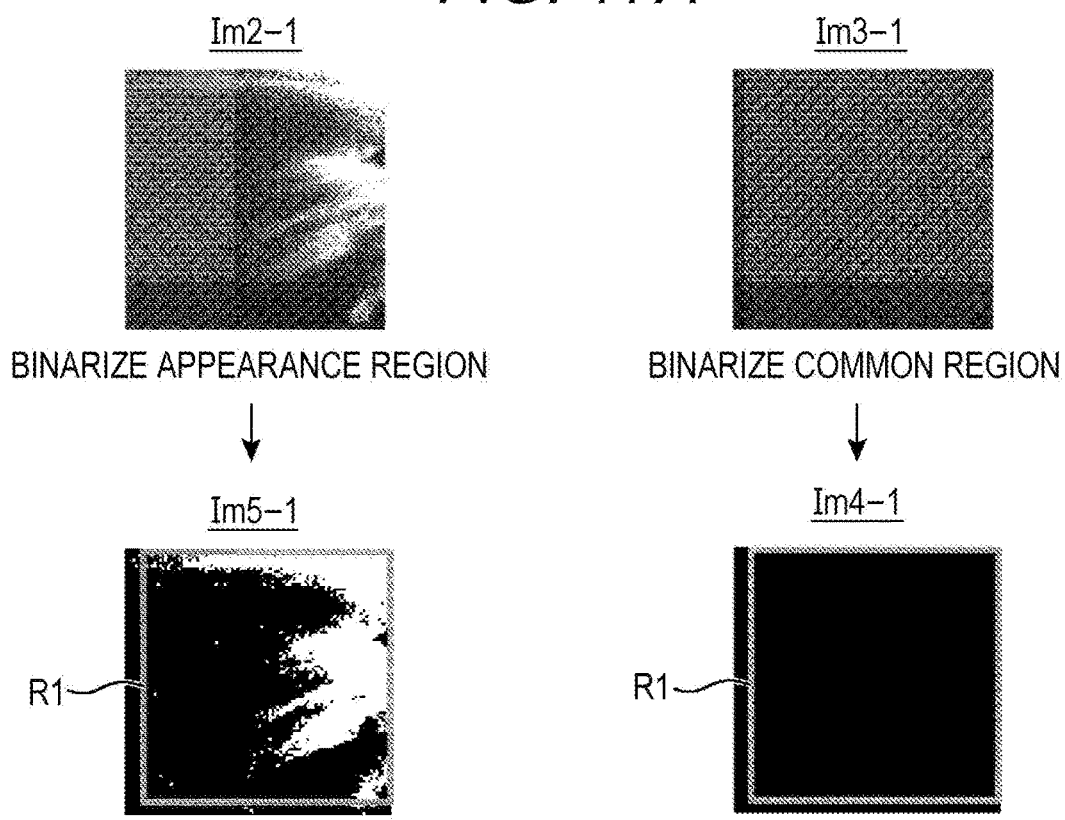
FIG. 17A provides image views illustrating: the second image illustrated in FIG. 16A; a fifth image obtained by binarizing this; the third image illustrated in FIG. 16A; and a fourth image obtained by binarizing this.

Next, a description will be provided for determination on whether it is case where the gas constantly comes out from the same position or the case where the gaseous substance has flows into the view field of the infrared camera 2 (step S103 in FIG. 12). FIG. 17A provides image views illustrating the second image Im2-1 illustrated in FIG. 16A, a fifth image Im5-1 obtained by binarizing this, the third image Im3-1 illustrated in FIG. 16A, and a fourth image Im4-1 obtained by binarizing this. In FIG. 17A, not entire portions of these images but portions of these images corresponding to the infrared image Im0-1 illustrated in FIG. 13A are illustrated.

The fifth processor 95 illustrated in FIG. 1A generates the fifth image Im5-1 that is the binarized image while setting, as a pixel constituting an appearance region, a pixel having a value exceeding a predetermined second threshold in the second image Im2-1. In a case where any appearance region is included in the second image Im2, the appearance region is indicated in white and gray. In a case where an appearance region is included in the fifth image Im5, the appearance region is illustrated in white. Appearance regions are included in the second image Im2-1 and the fifth image Im5-1. The fifth processor 95 picks out a gas appearance region by a known method such as morphology, and sets a rectangle circumscribed with the appearance region in the fifth image Im5-1. Consequently, a circumscribed rectangle R1 is set in the appearance region of the fifth image Im5-1.

The fourth processor 94 illustrated in FIG. 1A generates the fourth image Im4-1 that is the binarized image while setting, as a pixel constituting a common region, a pixel having a value exceeding a predetermined first threshold in the third image Im3-1. In a case where any common region is included in the third image Im3, the common region is indicated in white and gray. In a case where any common region is included in the fourth image Im4, the common region is indicated in white. No common region is included in the third image Im3-1 and the fourth image Im4-1. The fourth processor 94 sets a circumscribed rectangle R1 in the fourth image Im4-1. A setting position is a pixel position same as a pixel position of the circumscribed rectangle R1 set in the fifth image Im5-1.

In a case where a ratio of the number of pixels in the common region exceeds a predetermined third threshold (such as 30%) between the number of pixels in the common region included in the rectangle region R1 set in the fourth image Im4-1 and the number of pixels of the appearance region included in the rectangle region R1 set in the fifth image Im5-1, the determiner 96 (first determiner) illustrated in FIG. 1A determines that it is the case where the gas constantly comes out from the same position, and in the case where the ratio is the third threshold or less, the determiner determines that it is the case where the gaseous substance has flown into the view field of the infrared camera 2. Here, the determiner 96 determines that it is the case where the gaseous substance has flown into the view field of the infrared camera 2.

Figure 17B:
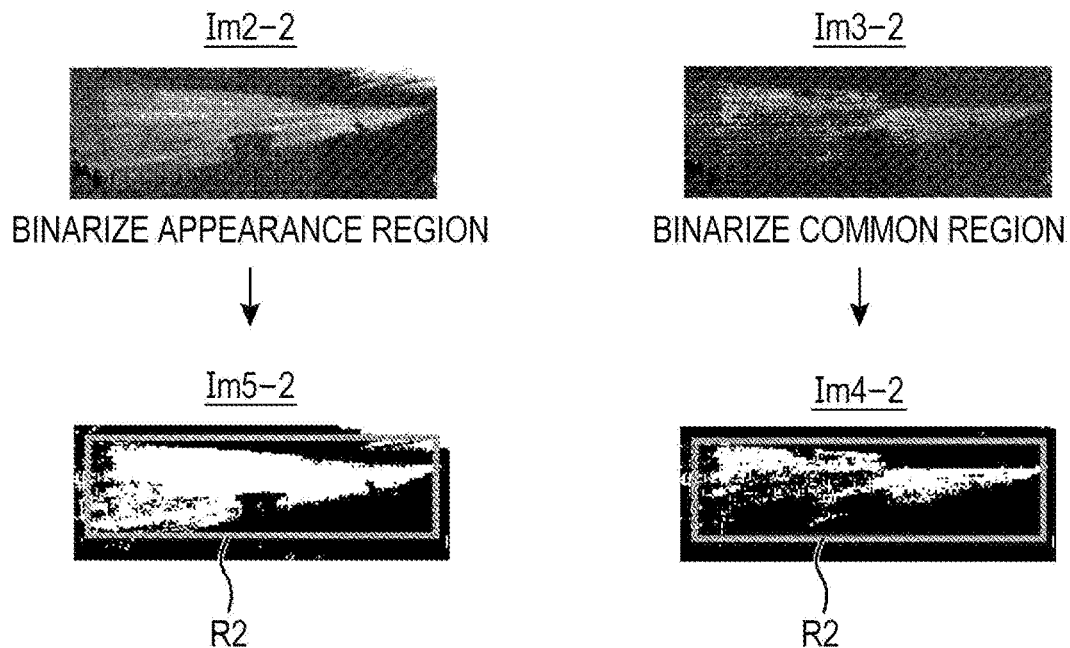
FIG. 17B provides image views illustrating: the second image illustrated in FIG. 16B; a fifth image obtained by binarizing this; the third image illustrated in FIG. 16B; and a fourth image obtained by binarizing this.

FIG. 17B provides image views illustrating the second image Im2-2 illustrated in FIG. 16B, a fifth image Im5-2 obtained by binarizing this, the third image Im3-2 illustrated in FIG. 16B, and a fourth image Im4-2 obtained by binarizing this. In FIG. 17B, not entire portions of these images but portions of these images corresponding to the infrared image Im0-2 illustrated in FIG. 13B are illustrated.

The fifth processor 95 generates the fifth image Im5-2 that is the binarized image while setting, as a pixel constituting an appearance region, a pixel having a value exceeding the second threshold in the second image Im2-2. In a case where any appearance region is included in the second image Im2, the appearance region is indicated in white and gray. In a case where an appearance region is included in the fifth image Im5, the appearance region is illustrated in white. Appearance regions are included in the second image Im2-2 and the fifth image Im5-2. The fifth processor 95 picks out a gas appearance region by the known method such as the morphology, and sets a rectangle circumscribed with the appearance region in the fifth image Im5-2. Consequently, a circumscribed rectangle R2 is set in the appearance region of the fifth image Im5-2.

The fourth processor 94 generates the fourth image Im4-2 that is the binarized image while setting, as a pixel constituting a common region, a pixel having a value exceeding the predetermined first threshold in the third image Im3-2. In a case where any common region is included in the third image Im3, the common region is indicated in white and gray. In a case where any common region is included in the fourth image Im4, the common region is indicated in white. Common regions are included in the third image Im3-2 and the fourth image Im4-2. The fourth processor 94 sets a circumscribed rectangle R2 in the fourth image Im4-2. A setting position is a pixel position same as a pixel position of the circumscribed rectangle R2 set in the fifth image Im5-2.

In a case where a ratio of the number of pixels in the common region exceeds the above-mentioned third threshold (30%) between the number of pixels in the common region included in the rectangle region R2 set in the fourth image Im4-2 and the number of pixels of the appearance region included in the rectangle region R2 set in the fifth image Im5-2, the determiner 96 (first determiner) determines that it is the case where the gas constantly comes out from the same position, and in the case where the ratio is the third threshold or less, the determiner determines that it is the case where the gaseous substance has flown into the view field of the infrared camera 2. Here, the determiner 96 determines that it is the case where the gas constantly comes out from the same position.

Note that there is a mode in which the fifth image Im5 is not used although in the above the fifth image Im5 is used to determine whether it is case where the gas constantly comes out from the same position or the case where the gaseous substance has flows into the view field of the infrared camera 2. Referring to FIGS. 17A and 17B, for example, when the number of pixels in the common region included in the fourth image Im4 exceeds a predetermined fourth threshold value, the determiner 96 (second determiner) determines that it is the case where the gas constantly comes out from the same position, and when the number of pixels is the fourth threshold or less, the determiner determines that it is the case where the gaseous substance has flown into the view field of the infrared camera 2.

The determiner 96 uses a binarized image to determine whether it is the case where the gas constantly comes out from the same position or the case where the gaseous substance has flown into the view field of the infrared camera 2, but a gray scale image may also be used. Referring to FIGS. 17A and 17B, for example, when a value obtained by adding values of pixels constituting the common region included in a third image Im3 exceeds a predetermined fifth threshold, the determiner 96 determines that it is the case where the gas constantly comes out from the same position (third image Im3-2), and when the value is the fifth threshold or less, the determiner 96 determines it is the case where the gaseous substance has flown into the view field of the infrared camera 2 (third image Im3-1).

Main functions and effects of the embodiment will be described. In the case where the gas constantly comes out from the same position, the gas is constantly present in the view field of the infrared camera 2. Therefore, the gas candidate regions are present in entire parts in all of the three predetermined periods. The three predetermined periods correspond to, for example, "former 5 seconds," "5 seconds," and "latter 5 seconds" described with reference to FIGS. 16A and 16B. The gas candidate region is, for example, the region indicated in white and gray included in the first image Im1 illustrated in FIG. 14.

On the other hand, in the case where the gaseous substance has flown into the view field of the infrared camera 2, the state in which the gaseous substance does not flow into the view field of the infrared camera 2 is changed to the state in which the gaseous substance flows thereto. Therefore, a gas candidate region may be present in an entire part of a certain predetermined period, but a gas candidate region may not be present in an entire part of another predetermined period or the gas candidate region may be present in a part of the period.

The gas irregularly fluctuates. Even in the case where the gas constantly comes out from the same position, when comparing respective time points in the predetermined period, positions of the gas candidate regions do not coincide with each other as illustrated in FIG. 14. Therefore, in a case where an appearance region is set as a region where the gas candidate region has appeared in an entire part of the predetermined period, the appearance region is not extracted, or the area of the appearance region is reduced even though extracted. Hence, the appearance region is to be set as a region indicating that the gas candidate region has appeared in at least a part of the predetermined period. With such a setting, the area of the appearance region can be made constantly relatively large in the case where the gas constantly comes out from the same position (e.g., FIG. 16B). When the predetermined period is set to, for example, 5 seconds, the "at least a part of the predetermined period" may be an entire part of the predetermined period (5 seconds) or may be a part of the predetermined period (for example, 1 second).

In the case where the gas constantly comes out from the same position, gas candidate regions are present in entire parts of all of the three predetermined periods. Therefore, as illustrated in FIG. 16B, relatively large appearance regions are present in all of the three predetermined periods respectively. In other words, the relatively large appearance regions are included in all of the three second images Im2-5, Im2-2, and Im2-6 respectively. On the other hand, in the case where the gaseous substance has flown into the view field of the infrared camera 2, a relatively large appearance region is present in a certain predetermined period, but an appearance region may not be present, or a relatively small appearance region may be present in other predetermined periods. In other words, as illustrated in FIG. 16A, a relatively large appearance region is included in the second image Im2-1 but no appearance region is included (even in a case where an appearance region is included, the area of the appearance region is relatively small) in the second images Im2-3 and Im2-4 among the three second images Im2-3, Im2-1, and Im2-4.

Note that the two or more of the predetermined periods may be continuous (for example, one predetermined period is from 0 to 5 seconds and another predetermined period is from 5 seconds to 10 seconds), may be separated from each other (for example, one predetermined period is from 0 to 5 seconds and another predetermined period is from 10 to 15 seconds), or may partly overlap with each other (for example, one predetermined period is from 0 to 5 seconds and another predetermined period is from 3 to 8 seconds).

A common region is a region common among appearance regions. Referring to FIG. 16B, in the case where the gas constantly comes out from the same position, relatively large appearance regions are included in all of the three second images Im2-5, Im2-2, and Im2-6. Therefore, the common region having a certain degree of the area is included in the third image Im3-2. On the other hand, referring to FIG. 16A, in the case where the gaseous substance has flown into the view field of the infrared camera 2, the relatively large appearance region is included in the second image Im2-1, but no appearance region is included in the second images Im2-3 and Im2-4 (even though any appearance region is included, the area of the appearance region is relatively small). Therefore, no common region is included in the third image Im3-1 (even though any common region is included, the area of the common region is relatively small).

Accordingly, the case where the gas constantly comes out from the same position and the case where the gaseous substance has flown into in the view field of the infrared camera 2 can be distinguished based on a common region. As a result, according to the embodiment, gas detection accuracy can be improved.

Conclusion of Embodiments

A gas-detection image processing device according to one mode of the embodiment includes: a first processor that generates a plurality of first images by applying processing to extract a gas candidate region to each of a plurality of infrared images captured in time series during a predetermined period; and a second processor that generates, using the plurality of first images, a second image by applying processing to extract an appearance region indicating that the gas candidate region has appeared in at least a part of the predetermined period, in which the second processor generates two or more of the second images by applying the processing to extract the appearance region to the plurality of first images generated in a manner corresponding to two or more of the predetermined periods respectively, and the gas-detection image processing device further includes a third processor that generates a third image by executing processing to extract a common region of the appearance regions while using the two or more of the second images.

The first processor generates the plurality of first images based on the respective plurality of infrared images captured in time series during the predetermined period. In the plurality of first images arrayed in time series, the period from an initial first image to a final first image corresponds to the predetermined period.

In the case where a gas constantly comes out from the same position, the gas is constantly present in a view field of a camera. Therefore, the gas candidate regions are present in entire parts in all of two or more of the predetermined periods. On the other hand, in a case where a gaseous substance has flown into the view field of the camera, a state in which a gaseous substance does not flow into the view field of the camera is changed to a state in which the gaseous substance flows thereto. Therefore, a gas candidate region may be present in an entire part of a certain predetermined period, but a gas candidate region may not be present in an entire part of another predetermined period or the gas candidate region may be present in a part of the period. Here, the gas that constantly comes out from the same position is a gas to be detected, and a gaseous substance that is flowing (for example, steam) is a gas not to be detected.

The gas irregularly fluctuates. Even in the case where the gas constantly comes out from the same position, when comparing respective time points in the predetermined period, positions of gas candidate regions do not coincide with each other. Therefore, in a case where an appearance region is set as a region where the gas candidate region has appeared in an entire part of the predetermined period, the appearance region is not extracted, or the area of the appearance region is reduced even though extracted. Hence, the appearance region is to be set as a region indicating that the gas candidate region has appeared in at least a part of the predetermined period. With such a setting, the area of the appearance region can be made constantly relatively large in the case where the gas constantly comes out from the same position. When the predetermined period is set to, for example, 5 seconds, the "at least a part of the predetermined period" may be an entire part of the predetermined period (5 seconds) or may be a part of the predetermined period (for example, 1 second).

In the case where the gas constantly comes out from the same position, the gas candidate regions are present in entire parts in all of the two or more of the predetermined periods, and therefore, relatively large appearance regions are present in all of the two or more of the predetermined periods. In other words, the relatively large appearance regions are included in all of the two or more of the second images. On the other hand, in the case where the gaseous substance has flown into the view field of the camera, a relatively large appearance region may be present in a certain predetermined period, but no appearance region is present, or a relatively small appearance region may be present in other predetermined periods. In other words, among the two or more of the second images, a relatively large appearance region is included in a certain second image, but no appearance region or a relatively small appearance region may be included in other second images.

Note that the two or more of the predetermined periods may be continuous (for example, one predetermined period is from 0 to 5 seconds and another predetermined period is from 5 seconds to 10 seconds), may be separated from each other (for example, one predetermined period is from 0 to 5 seconds and another predetermined period is from 10 to 15 seconds), or may partly overlap with each other (for example, one predetermined period is from 0 to 5 seconds and another predetermined period is from 3 to 8 seconds).

A common region is a region common among appearance regions. In the case where the gas constantly comes out from the same position, a relatively large appearance region is included in all of the two or more of second images, and therefore, the common region has a certain degree of the area. On the other hand, in the case where the gaseous substance has flown into the view field of the camera, a relatively large appearance region is included in a certain second image, but no appearance region or a relatively small appearance region is included in other second images. Therefore, there is no common region or a common region having the small area.

Accordingly, the case where the gas constantly comes out from the same position and the case where the gaseous substance has flown into in the view field of the camera can be distinguished based on a common region. As a result, according to the gas-detection image processing device according to the one mode of the embodiment, gas detection accuracy can be improved.

As a configuration to achieve the above distinguishing, there are a first example and a second example as follows. The first example is as described below. A fourth processor generates a fourth image by binarizing the third image by using a predetermined first threshold (preferably, the fourth processor generates the fourth image that is a binarized image by setting, as a pixel constituting the common region, a pixel having a value exceeding the predetermined first threshold in the third image). A fifth processor generates a fifth image by binarizing one of two or more of the second images by using a predetermined second threshold (preferably, the fifth processor generates the fifth image that is a binarized image by setting, as a pixel constituting the appearance region, a pixel having a value exceeding the predetermined second threshold in the one of the two or more of the second image). When a ratio of the number of pixels in the common region exceeds a predetermined third threshold between the number of pixels in the common region included in the fourth image and the number of pixels of the appearance region included in the fifth image, the first determiner determines that it is the case where the gas constantly comes out from the same position, and when the ratio is the third threshold or less, the first determiner determines that it is the case where the gaseous substance has flown into the view field of the camera.

The second example is as follows. When the number of pixels in the common region included in the fourth image exceeds a predetermined fourth threshold, the second determiner determines that it is the case where the gas constantly comes out from the same position, and when the number of pixels is the fourth threshold or less, the second determiner determines that it is the case where the gaseous substance has flown into the view field of the camera.

In the above configurations, the second processor generates the second image while setting, as a value of a pixel located in the same order of the second image, a maximum value of values indicated by pixels located in the same order in the plurality of first images.

This configuration is an exemplary method of generating the second image. For example, when a maximum value of values of first pixels is a in the plurality of first images, a value of a first pixel is set to a in the second image. Values of remaining pixels of the second image are similarly determined. Thus, when the values of the pixels constituting the second image are determined, an appearance region is extracted.

In the above configuration, the third processor generates the third image while setting, as a value of a pixel located in the same order of the third image, a minimum value of values indicated by pixels located in the same order in two or more of the second images.

This configuration is an exemplary method of generating the third image. For example, when a minimum value of values of first pixels is set to $\beta$ in the two or more of second images, a value of a first pixel is set to $\beta$ in the third image. Values of remaining pixels of the third image are similarly determined. Thus, when the values of the pixels constituting the third image are determined, a common region is extracted.

A gas-detection image processing method according to another mode of the embodiment includes: a first processing step of generating a plurality of first images by applying processing to extract a gas candidate region to each of a plurality of infrared images captured in time series during a predetermined period; and a second processing step of generating a second image, while using the plurality of first images, by applying processing to extract an appearance region indicating that the gas candidate region has appeared in at least a part of the predetermined period, in which the second processing step includes generating two or more of the second images by applying the processing to extract the appearance region to the plurality of first images generated in a manner corresponding to two or more of the predetermined periods respectively, and the gas-detection image processing method further includes a third processing step of generating a third image by applying processing to extract a common region of the appearance regions while using the two or more of the second images.

The gas-detection image processing method according to another mode of the embodiment defines the gas-detection image processing device according to the one mode of the embodiment from the viewpoint of the method, and has functions and effects similar to those of the gas-detection image processing device according to the one mode of the embodiment.

A gas-detection image processing program according to still another mode of the embodiment, causing a computer to execute: a first processing step of generating a plurality of first images by applying processing to extract a gas candidate region to each of a plurality of infrared images captured in time series during a predetermined period; and a second processing step of generating a second image, while using the plurality of first images, by applying processing to extract an appearance region indicating that the gas candidate region has appeared in at least a part of the predetermined period, in which the second processing step includes generating two or more of the second images by applying the processing to extract the appearance region to the plurality of first images generated in a manner corresponding to the two or more of the predetermined periods respectively, and the gas-detection image processing program further causes the computer to execute a third processing step of generating a third image by applying processing to extract a common region of the appearance regions while using the two or more of the second images.

The gas-detection image processing program according to the still another mode of the embodiment defines the gas-detection image processing device according to the one mode of the embodiment from the viewpoint of the program, and provides the functions and effects similar to the gas-detection image processing device according to the one mode of the embodiment.

The embodiments of the present invention have been illustrated and described in detail, but note that those are simply examples and practical example, and not intended to be limitative. The scope of the present invention should be construed by the wordings of the appended claims.

The entire disclosure of Japanese Patent Application No. 2017-091795 filed on May 2, 2017 is hereby incorporated by reference in its entirety.

INDUSTRIAL APPLICABILITY

According to the present invention, it is possible to provide a gas-detection image processing device, a gas-detection image processing method, and a gas-detection image processing program.

The invention claimed is:

1. A gas-detection image processing device comprising:
a hardware processor configured to perform:
a first processing that generates a time sequential plurality of first type images by applying processing to extract a gas candidate region to each of a plurality of infrared images captured in time series during a predetermined period;
a second processing that generates two or more second type images, in which the two or more second type images include a first instance of the second type images obtained by extracting an appearance region indicating that the gas candidate region has appeared at least in a part of a first predetermined period based on two or more instances of the first type images corresponding to the first predetermined period out of the plurality of first type images, and a second instance of the second type images obtained by extracting an appearance region indicating that the gas candidate region has appeared at least in a part of a second predetermined period based on the two or more further instances of the first type images corresponding to the second predetermined period including a period not included in the first predetermined period out of the plurality of first type images; and
a third processing that generates a third type image by executing processing to extract a common region of the appearance regions while using the two or more of the second type images.

2. The gas-detection image processing device according to claim 1, wherein the second processing generates the two or more second type images while setting, as a value of a pixel located in a same order of the two or more second type images, a maximum value of values indicated by pixels located in the same order in the plurality of first type images.

3. The gas-detection image processing device according to claim 1, wherein the third processing generates the third type image while setting, as a value of a pixel located in a same order of the third type image, a minimum value of values indicated by pixels located in the same order in the two or more of the second type images.

4. The gas-detection image processing device according to claim 1, wherein the hardware processor of the gas-detection image processing device is further configured to perform a fourth processing that generates a fourth type image by performing, for the third type image, binarization using a predetermined first threshold.

5. The gas-detection image processing device according to claim 4, wherein the hardware processor of the gas-detection image processing device is further configured to perform:
a fifth processing that generates a fifth type image by performing, for one instance of the two or more of the second type images, binarization using a predetermined second threshold; and
a first determining that determines that it is a case where a gas constantly comes out from a same position when a ratio of number of pixels in the common region between the number of pixels in the common region included in the fourth type image and number of pixels of the appearance region included in the fifth type image exceeds a predetermined third threshold, the first determining further determining that it is a case where a gaseous substance has flown into a view field of a camera when the ratio of the number of pixels in the common region is the third threshold or less.

6. The gas-detection image processing device according to claim 4, wherein the hardware processor of the gas-detection image processing device is further configured to perform a second determining that determines that it is a case where a gas constantly comes out from a same position when number of pixels in the common region included in the fourth type image exceeds a predetermined fourth threshold, the second determining further determining that it is a case where a gaseous substance has flown into a view field of a camera when the number of pixels in the common region is the fourth threshold or less.

7. The gas-detection image processing device according to claim 2, wherein the third processing generates the third type image while setting, as a value of a pixel located in a same order of the third type image, a minimum value of values indicated by pixels located in the same order in the two or more of the second type images.

8. The gas-detection image processing device according to claim 2, wherein the hardware processor of the gas-detection image processing device is further configured to perform a fourth processing that generates a fourth type image by performing, for the third type image, binarization using a predetermined first threshold.

9. The gas-detection image processing device according to claim 3, wherein the hardware processor of the gas-detection image processing device is further configured to perform a fourth processing that generates a fourth type image by performing, for the third type image, binarization using a predetermined first threshold.

10. The gas-detection image processing device according to claim 1, wherein the hardware processor of the gas-detection image processing device is further configured to perform, based on an area of the common region, an identification between an event in which a gas constantly comes out from a same position and an event in which a gaseous substance is flowing.

11. A gas-detection image processing method comprising:
generating a sequential plurality of first type images by applying processing to extract a gas candidate region to each of a plurality of infrared images captured in time series during a predetermined period;

generating two or more second type images, in which the two or more second type images include a first instance of the second type images obtained by extracting an appearance region indicating that the gas candidate region has appeared at least in a part of a first predetermined period based on two or more instances of the first type images corresponding to the first predetermined period out of the plurality of first type images, and a second instance of the second type images obtained by extracting an appearance region indicating that the gas candidate region has appeared at least in a part of a second predetermined period based on two or more further instances of the first type images corresponding to the second predetermined period including a period not included in the first predetermined period out of the plurality of first type images; and generating a third type image by applying processing to extract a common region of the appearance regions while using the two or more of the second type images.

12. The gas-detection image processing method according to claim 11, wherein the method further comprises performing, based on an area of the common region, an identification between an event in which a gas constantly comes out from a same position and an event in which a gaseous substance is flowing.

13. A non-transitory recording medium storing a computer readable gas-detection image processing program causing a computer to execute:

generating a sequential plurality of first type images by applying processing to extract a gas candidate region to each of a plurality of infrared images captured in time series during a predetermined period;

generating two or more second type images, in which the two or more second type images include a first instance of the second type images obtained by extracting an appearance region indicating that the gas candidate region has appeared at least in a part of a first predetermined period based on two or more instances of the first type images corresponding to the first predetermined period out of the plurality of first type images, and a second instance of the second type images obtained by extracting an appearance region indicating that the gas candidate region has appeared at least in a part of a second predetermined period based on two or more further instances of the first type images corresponding to the second predetermined period including a period not included in the first predetermined period out of the plurality of first type images; and generating a third type image by applying processing to extract a common region of the appearance regions while using the two or more of the second type images.

14. The non-transitory recording medium according to claim 13, wherein the program further causes the computer to execute performing, based on an area of the common region, an identification between an event in which a gas constantly comes out from a same position and an event in which a gaseous substance is flowing.

* * * * *